United States Patent
Viswanathan Iyer et al.

(10) Patent No.: US 11,463,656 B1
(45) Date of Patent: Oct. 4, 2022

(54) SYSTEM AND METHOD FOR RECEIVED VIDEO PERFORMANCE OPTIMIZATIONS DURING A VIDEO CONFERENCE SESSION

(71) Applicant: Dell Products, LP, Round Rock, TX (US)

(72) Inventors: Vivek Viswanathan Iyer, Austin, TX (US); Todd E. Swierk, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/368,118

(22) Filed: Jul. 6, 2021

(51) Int. Cl.
*H04N 7/15* (2006.01)
*H04N 19/172* (2014.01)
*H04N 19/174* (2014.01)
*G06V 20/40* (2022.01)
*G06V 40/10* (2022.01)

(52) U.S. Cl.
CPC .............. *H04N 7/15* (2013.01); *G06V 20/41* (2022.01); *G06V 40/10* (2022.01); *H04N 19/172* (2014.11); *H04N 19/174* (2014.11)

(58) Field of Classification Search
CPC ...... H04N 7/15; H04N 19/174; H04N 19/172; G06K 9/00
USPC ............................................ 348/14.01–14.16
See application file for complete search history.

(56) References Cited

U.S. PATENT DOCUMENTS

| 8,171,151 | B2 | 5/2012 | Dunbar |
| 8,401,232 | B2 | 3/2013 | Fan |
| 8,436,889 | B2 | 5/2013 | Eleftheriadis |
| 8,711,255 | B2 | 4/2014 | Yamashita |
| 8,780,166 | B2 | 7/2014 | Shanmukhadas |
| 8,988,491 | B2 | 3/2015 | Yamashita |
| 9,008,320 | B2 | 4/2015 | Sakagami |
| 9,082,391 | B2 | 7/2015 | Yermeche |
| 9,432,625 | B2 | 8/2016 | Delegue |
| 9,503,685 | B2 | 11/2016 | Baron, Jr. |
| 10,257,522 | B2 | 4/2019 | Sato |
| 10,542,255 | B2 | 1/2020 | Alakuijala |

(Continued)

FOREIGN PATENT DOCUMENTS

WO    WO-2020118503 A1 * 6/2020

OTHER PUBLICATIONS

H. Purwins, et al., "Deep Learning for Audio Signal Processing," Journal of Selected Topics of Signal Processing, vol. 13, No. 2, May 2019, 15 pages.

*Primary Examiner* — Melur Ramakrishnaiah
(74) *Attorney, Agent, or Firm* — Prol Intellectual Property Law, PLLC; H. Kenneth Prol

(57) ABSTRACT

A sink information handling system executing a multimedia multi-user collaboration application (MMCA) may comprise a network interface device to receive a plurality of video frame slices of a video frame of a remote participant user of a source information handling system participating in a video conference session, the network interface device to receive an identification of a subset of the plurality of video frame slices having an assigned probability of presence of the remote participant's body that exceeds a threshold probability, based on a human object presence (HOP) heat map, as a HOP video frame slice group, the processor to decode data within the HOP video frame slice group, and a digital display device to display the video frame, as transformed by the audio/visual processing instruction algorithm.

20 Claims, 8 Drawing Sheets

(56) References Cited

U.S. PATENT DOCUMENTS

| | | |
|---|---|---|
| 10,554,977 B2 | 2/2020 | Fu |
| 10,666,903 B1 * | 5/2020 | Wu ........................ H04N 19/85 |
| 2004/0267778 A1 | 12/2004 | Rudolph |
| 2004/0268369 A1 | 12/2004 | Debique |
| 2006/0094001 A1 | 5/2006 | Torre |
| 2009/0323818 A1 | 12/2009 | Weiss |
| 2011/0074910 A1 | 3/2011 | King |
| 2011/0283203 A1 | 11/2011 | Periyannan |
| 2018/0007364 A1 | 1/2018 | Noraz |
| 2019/0303677 A1 * | 10/2019 | Choutas ................. G06V 40/20 |

* cited by examiner

SYSTEM AND METHOD FOR RECEIVED VIDEO PERFORMANCE OPTIMIZATIONS DURING A VIDEO CONFERENCE SESSION

CROSS REFERENCE TO RELATED APPLICATIONS #

Related subject matter is contained in the following co-pending applications:

U.S. application Ser. No. 17/157,586, filed Jan. 25, 2021, entitled "A SYSTEM AND METHOD FOR VIDEO PERFORMANCE OPTIMIZATIONS DURING A VIDEO CONFERENCE SESSION," invented by Vivek Viswanathan Iyer, et al., and assigned to the assignee hereof.

FIELD OF THE DISCLOSURE

The present disclosure generally relates to multimedia, multi-user collaboration applications, such as videoconferencing applications. The present disclosure more specifically relates to optimizing video performance during execution of a multimedia, multi-user collaboration applications, such as videoconferencing applications.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a video/graphic display device through which a user may conduct a video conference session.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
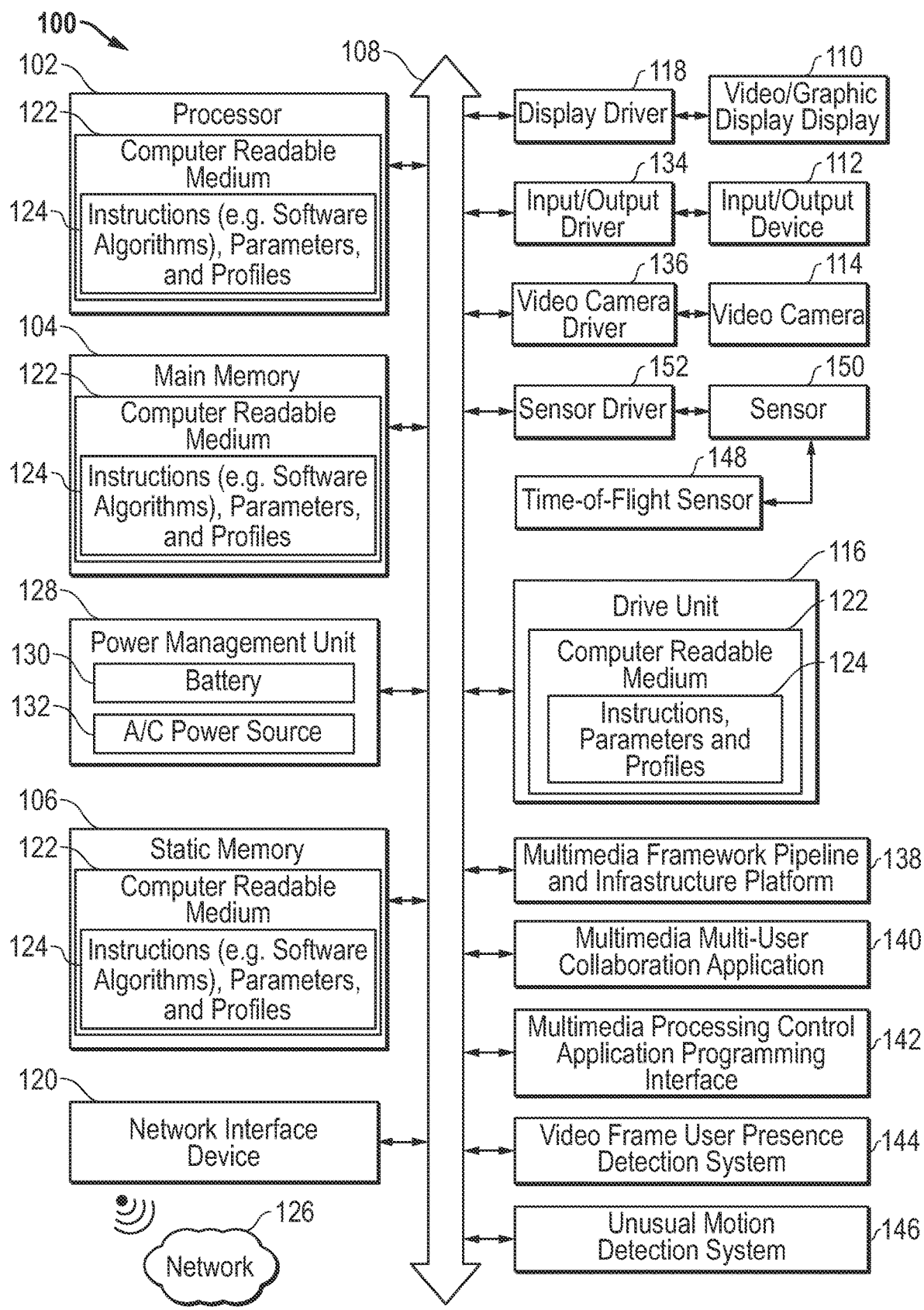
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, only one or a handful of meeting participants are actively engaged in the meeting, as presenters, or as active participants in a discussion, for example. However, most existing multimedia multi-user collaboration applications (MMCA) hosting such video conferences perform the same video processing methods on videos of each participant. Such processing may occur both at each individual participant's computing device, and at all other participant's computing devices, after the video of a single participant has been transmitted to the computing devices of all other participants. Further, such processing for MMCA functions of the video conference session can be computationally intensive and burdens processor resources. Thus, the MMCA processing burden depend on the functions of the video conference via the MMCA or the function of other applications operating on an information handling system.

Embodiments of the present disclosure provide for an information handling system that includes a memory, and a power management unit for receipt of a video of a remote participant in a video conference session conducted by the MMCA via a first network link on a network interface device. The information handling system may also receive a time-of-flight (TOF) sensor data or other distance sensor data descriptive of the distance between a remote participant's body and a video camera capturing images of the remote participant at the remote participant's remote information handling system during the video conferencing session. The remote information handling system may operate as a source of audio and video of the remote participant, and may thus be referred to herein as a source information handling system. The information handling system executing methods or processes described herein may operate to receive audio and video of the remote participant from the source information handling system, and may thus be referred to herein as a sink information handling system.

In an embodiment, as the source information handling system receives video frames from the video camera, the processor of the source information handling system may execute a video frame user presence detection system to slice a video frame into a plurality of video frame slices and based on the distance data, create a human object presence (HOP) heat map. In this embodiment, the processor of the source information handling system may also be configured to assign a probability of the presence of the remote participant's body within each video frame slice of the video frame based on distance data of objects or a remote participant's body appearing in each video frame slice relative to all other slices. The probability assigned to each of the video frame slices provides the processor with the ability to select, among the plurality of video frame slices, those video frame slices with an assigned probability of presence of the remote participant's body that exceeds a threshold probability in order to create a HOP video frame slice group as a set of video frame slices indicating where the remote participant's body appears within the video frame.

By doing so, those video frame slices used to define the HOP video frame slice may be encoded using, for example, a first encoding algorithm that may consume more processing resources, but yields less data loss and a higher quality transfer of this portion of the video frame. For a video conference, the images of the remote participant in the video frames may be more important to have a high-quality image transmitted than background portions of the video frame. In another aspect, those video frame slices that fall outside of the HOP heat map and the HOP video frame slice may be encoded using second encoding algorithm having a lower computational burden than the first encoding algorithm. This reduces the processing resources used to encode a single video frame at the source information handling system. The sink information handling system may receive data defining the HOP heat map and the HOP video frame slice group from the source information handling system (e.g., remote participant's information handling system) over the network to assist decoding of the video frame at the sink information handling system. In an embodiment, the data defining the HOP heat map and the HOP video frame slice group may be received by the sink information handling system using an out-of-band communication. In an embodiment, the data defining the HOP heat map and the HOP video frame slice group may be received by the sink information handling system prior to or concurrently with the video frame associated with the HOP heat map and the HOP video frame slice group being sent by the source information handling system. In some embodiments, a HOP heat map and identified HOP video frame slice group may be transmitted on parallel network links with transmitted video frames during a video conference session.

In another embodiment, the system and method may include the unusual motion detection system providing data descriptive of a delta HOP heat map. The delta HOP heat map may describe changes in position of the human image within the plurality of video frame slices over a plurality of video frames captured by the source information handling system and detected by the unusual motion detection system as movement of an object or the remote participant in the captured video frames. The delta HOP heat map indicates changes in probabilities of remote participant presence in video frame slices and, thus, any changes to the original HOP heat map and the HOP video frame slice group. Here, the sink information handling system may receive the data of the delta HOP heat map and the HOP video frame slice group from the source information handling system in preparation for decoding of the video frames at the sink information handling system after a first video frame and associated HOP heat map or HOP video frame slice group have been received. The delta HOP heat map may therefor provide additional information to the sink information handling system regarding how the remote participant's image moves within a series of subsequent video frames in another embodiment. The HOP heat map also reduces the amount of data describing the changes in the HOP heat map instead of processing a new HOP heat map for each video frame received at the sink or remote information handling system.

In an embodiment, the use of a virtual background may be detected by the MMCA of the source information handling system and, with the data describing the HOP heat map and the HOP video frame slice group, the processor may identify the video frame slices where the remote participant's body is found and, with the execution of a matting algorithm, segmentation algorithm, or other bounding detection algorithms, reduce an area of computation necessary at the source information handling system to detect the outline of the remote participant for use with the virtual background application. In this manner, the data provided by the HOP video frame slice group may help to facilitate the detection of a remote participant's outline over the virtual background at the source information handling system.

As described, in an embodiment, the processor of the source information handling system may execute a first encoding algorithm to encode the data within the HOP video frame slice group for transmission by the MMCA of the source information handling system to the sink information handling system while executing a second encoding algorithm having a lower computational burden than the first encoding algorithm to encode data outside of the HOP video frame slice group for transmission by the MMCA of the source information handling system to the sink information handling system. In this embodiment, the MMCA of the source information handling system may send this distinguishing encoding data to the sink information handling system defining which of the first and second encoding algorithms to use on the video frame slices of the HOP video frame slice group and the video frame slices outside of the HOP video frame slice group. This may be done, in an embodiment, prior to or concurrently with the video frame being sent to the sink information handling system so that the sink information handling system may apply the appropriate decoding algorithms in real-time as the video frames are processed.

The processor of the sink information handling system in an embodiment may receive the HOP heat map data, delta HOP heat map data, HOP video frame slices and accompanying data for video frames. In an embodiment, the sink information handling system may receive the HOP video frame slices, assignment of a subset of the video frame slices as falling within or outside the HOP video frame slice group, identification of the first encoding algorithm used to encode the data within the HOP video frame slice group, and identification of a second encoding algorithm used to encode the data outside the HOP video frame slice group. The processor of the sink information handling system may execute a first decoding algorithm corresponding to the first encoding algorithm to decode the data within the HOP video frame slice group for display via a digital display device of the sink information handling system. In such an embodiment, the processor of the sink information handling system may also execute a second decoding algorithm corresponding to the second encoding algorithm having a lower computational burden than the first decoding algorithm to decode data outside of the HOP video frame slice group of the video frame for display via the digital display device of the sink information handling system.

In some embodiments, the sink information handling system may receive updated assignments of a subset of the video frame slices within the video frame as falling within or outside the HOP video frame slice group for each video frame received in a streaming video feed. In such an embodiment, the sink information handling system may repeat the process described directly above for each video frame so received in order to limit the processing resources consumed continuously throughout the videoconference session.

In other embodiments, the sink information handling system may set the assignments of the subset of the video frame slices from the video frame as falling within or outside the HOP video frame slice group as a current or default HOP video frame slice group assignment. In such an embodiment, the sink information handling system may refer to the delta HOP heat map associated with each newly received video frame to determine whether any changes in the remote participant's position within the newly received video frame have occurred. When the delta HOP heat map for the newly received video frame indicates a change in the remote participant's position, this may indicate that some video frame slices may have moved from falling within the HOP video frame slice group to falling outside the HOP video frame slice group or vice versa. Thus, in such an embodiment, the sink information handling system may adjust the assignments of the HOP video frame slice group for the newly received video frame as the current or default HOP video frame slice group assignment. By only updating these assignments of certain video frame slices as falling within or outside the HOP video frame slice group when a change in the user's position has been detected, the sink information handling system may further decrease processing power associated with repeatedly determining which video frame slices fall within or outside the HOP video frame slice group for each received video frame.

The sink information handling system may further limit the processing resources consumed during further audio visual processing steps performed on each received video frame, following decoding of those frames. In various embodiments described herein, for example, a sink information handling system may execute a user framing module, a super resolution module, or a zoom and face normalizer module. The user framing module may operate to identify a user's face and center the user's face within each captured image making up the video sample. The zoom and face normalizer module of the sink information handling system may operate to crop, enlarge, or scale down various video frames of the remote participant user of the source information handling system to normalize the size of the remote participant's face across each of the video frames received from the source information handling system. Such processes in existing systems may require execution of a facial recognition algorithm to identify the portion of each frame that contains the remote participant's body, which may be processor intensive. In order to conserve processing resources consumed during these processes, the sink information handling system may leverage the HOP heat map data received from the source information handling system to avoid execution of a facial recognition algorithm across an active frame.

The super resolution module may recover a high-resolution image from a low-resolution image, using a known degradation function. As described herein, the portion of each video frame in which the remote participant appears may be the most important. As such, limiting execution of the super resolution module algorithm to those portions may conserve processing resources consumed without compromising the quality of the portion of video frames in which the remote participant is present. In order to conserve processing resources consumed during execution of the super resolution module, the HOP heat map data or delta HOP heat map data received from the source information handling system may be used to identify the video frame slices in which the remote participant is present, to avoid execution of the super resolution module algorithm to increase resolution of unimportant background imagery within each video frame.

The sink information handling system in embodiments described herein may access the HOP heat map data and indication of HOP videoframe slice groups associated with each video frame in order to determine the portion of the video frame that contains the remote participant's body. Thus, the sink information handling system may reduce to which portion of the video frame data the user framing module, super resolution module, or zoom and face normalizer module algorithms should be applied. In other embodiments also described herein, the sink information handling system may streamline this process by referring to the received delta HOP heat map data. For example, the sink information handling system may apply the user framing module, super resolution module, and zoom and face normalizer module algorithms based on the assignment of slices of a first received video frame to the HOP video frame slice group indicated to contain images of the remote participant's body, as defined within the HOP heat map data associated with this first received video frame. In order to avoid repeating this step for each video frame received from the source information handling system, the sink information handling system may refer to the delta HOP heat map data associated with each frame. If the delta HOP heat map data associated with a frame does not indicate movement of the remote participant between the last received frame and the current frame, this may indicate the HOP heat map data identifying which slices of the last received frame fall within the HOP video frame slice group may be used to determine which slices of the current frame fall within the HOP video frame slice group. In such a way, the sink information handling system may determine which video frame slices to which the user framing module, the super resolution module, and zoom and face normalizer algorithms should be applied over a plurality of received video frames without repeatedly referencing the HOP heat map associated with each frame, as it is received.

In certain embodiments, the processor of the source information handling system or the sink information handling system may execute an AV processing instruction manager used to offload execution of the user presence detection system to an alternative processor in the source information handling system or the sink information handling system, respectively. These alternative processors may include a graphical processing unit (GPU), a vision processing unit (VPU), a gaussian neural accelerator (GNA), among other types of processors.

The present specification further describes a method of reducing resource consumption at both a source information handling system and a sink information handling system during a video conferencing session. The method may include receiving at a source information handling system operated by a user located remotely from the sink information handling system, from a time-of-flight (TOF) sensor, distance data descriptive of the distance between the remote participant's body and the video camera of the source information handling system, and executing a multimedia multi-user collaboration application (MMCA) to establish the video conferencing session with a sink information handling system via a network interface device. The method may also include receiving at the source information handling system, from the video camera, a video frame and, with a processor of the source information handling system, executing a user presence detection system for: slicing the video frame into a plurality of video frame slices; based on the distance data, creating a human object presence (HOP) heat map assigning a probability of the presence of the remote participant's body within each video frame slice of the video frame, and selecting, among the plurality of video frame slices, that subset of video frame slices with an assigned probability of presence of the remote participant's body appearing in the video frame slices that exceeds a threshold probability. The method may further include creating a HOP heat map and HOP video frame slice group where the remote participant's body is found within the video frame and with a network interface device, sending data defining the HOP video frame slice group to a sink information handling system over the network for decoding of the video frame with the MMCA transmitting the encoded video frames for the video conference session.

The method may further include, with the execution of the MMCA at the source information handling system, detecting the actuation of a virtual background and, with the data describing the HOP video frame slice group, providing the data descriptive of the video frame slices where the remote participant's body is found within the boundary detection algorithm used to reduce an area of computation at the source information handling system to detect the outline of the remote participant for applying a virtual background. This decrease in computational burden at the source information handling system in such an embodiment may decrease time of such computation, and consequently decrease the time elapsing between the capturing of the remote participant in the video frames and receipt of those video frames at the source information handling system. This shortened time between capturing the video of the remote participant and display of that video at the sink information handling system may improve user experience at the sink information handling system. For example, decreasing this processing time may decrease latency and jitter—two factors commonly affecting MMCA user experience.

In an embodiment, the method may include receiving data defining the HOP heat map and the HOP video frame slice group at a sink information handling system over the network for decoding of the video frame using an out-of-band (OOB) communication on a network link separate from the encoded video frames. In an embodiment, the sink information handling system may receive the data defining the HOP heat map and the HOP video frame slice group via the OOB communication prior to receiving the encoded video frames from the source information handling system. The method may also, in some embodiments, involve receiving the delta HOP heat map for subsequent video frames instead of a HOP heat map for subsequent video frames.

In an embodiment, the method may include executing at the source information handling system an unusual motion detection processing instruction module to calculate a delta HOP heat map descriptive of changes in position of the human image within the plurality of video frame slices over a plurality of video frames captured by the video camera of the source information handling system. In an embodiment, this delta HOP heat map may be determined by comparing historic HOP heat maps with a currently created HOP heat map.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

The information handling system 100 described with reference to FIG. 1 may represent a transmitting (e.g., AV media data source or source information handling system) information handling system or a receiving (e.g., AV media data sink or sink information handling system) information handling system in various embodiments. In still other embodiments, information handling system 100 may operate as both a transmitting and a receiving information handling system to both transmit and receive AV media data, as may be the case for an information handling system transmitting video of one participant user while simultaneously executing code instructions for the MMCA 140 to display videos of other participants within a shared user session. In yet another embodiment, the information handling system 100 may operate remotely from all transmitting or receiving information handling systems while executing code instructions of the MMCA 140 to coordinate participation within a user session such as a MMCA control provider server. Additionally, some or all of the MMCA 140 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user session of the MMCA 140 may incorporate an agent or API for an information handling system performance optimizer application, for example. In an embodiment, this information handling system performance optimizer application may facilitate the coordination of the HOP heat map including the HOP video frame slice group or, in another embodiment, the delta HOP heat map with the transmission of video frames among the plurality of information handling systems participating in a video conference session as described herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input/output (I/O) devices 112, such as a keyboard, a mouse, a video/graphic display 110, or any combination thereof. In an embodiment, the I/O devices 112 may each include an associated input/output driver 134 to be executed by the processor 102 in order to enable an operating system of the information handling system 100 and other computer programs to access hardware functions of the input/output devices 112. The information handling system 100 may further include a display driver 118 to enable an operating system of the information handling system 100 and other computer programs to access the video/graphics display device 110. The information handling system 100 may also include a video camera driver 136 which may be part of a streaming media driver in the embodiments below to enable an operating system of the information handling system 100 and other computer programs to access the video camera 114 for acquisition of video frames during the operation of the MMCA 140. The information handling system 100 can also include one or more buses 108 operable to transmit communications between the various hardware components. Portions of an information handling system 100 may themselves be considered information handling systems 100 in an embodiment.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), graphical processing unit (GPU), vision processing unit (VPU), gaussian neural accelerator (GNA) control logic or some combination of the same. Any of these processing resources may operate to execute code that is either firmware or software code. Moreover, the information handling system 100 can include memory such as main memory 104, static memory 106, and drive unit 116 (volatile (e.g., random-access memory, etc.), nonvolatile (read-only memory, flash memory etc.) or any combination thereof) with computer readable medium 122 storing instructions 124 of the multimedia framework pipeline and infrastructure platform 138 (MFPIP), multimedia multi-user collaboration application 140 (MMCA), multimedia processing control application programming interface 142 (MPCAPI) video frame user presence detection system 144, unusual movement detection system 146, and other software systems instructions of the embodiments described herein. The information handling system 100 can also include one or more buses 108 operable to transmit communications between the various hardware components such as any combination of various input and output (I/O) devices.

The information handling system 100 may further include a video/graphic display device 110. The video/graphic display device 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard. The information handling system 100 can also include a disk drive unit 116.

In an embodiment, the information handling system 100 may include a network interface device 120 that can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wired or wireless data communication standards understood by those of skill. For example, to communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 120 may operate two or more wireless links.

The network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 GHz or 6 GHz frequency band such as 802.11 a/h/j/n/ac/ax/ay. It is understood that any number of available channels may be available under the 5 GHz or 6 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well as the NRFR1, NRFR2, bands, and other known bands. In an embodiment, the network interface device 120 with a wireless adapter may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. For example, one or more audio/visual (AV) processing instruction modules may be code sets with instructions 124 for performing various processing tasks on outgoing or incoming audio or video data streamed by an MMCA 140. Examples of just some AV processing instruction modules may include boundary detection modules, virtual background or blur modules, encode/decode modules, or compression modules. Similarly, the video frame user presence detection system 144 and unusual movement detection system 146 may also be code instructions 124 executed with the MMCA 140. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions 124, parameters, and profiles or receives and executes instructions 124, parameters, and profiles responsive to a propagated signal, so that a device connected to a network 126 can communicate voice, video or data over the network 126. Further, the instructions 124 may be transmitted or received over the network 126 via the network interface device 120 or a wireless adapter, for example.

The information handling system 100 can include a set of instructions 124 that can be executed to cause the computer system to perform any one or more of the methods or computer-based functions disclosed herein. For example, instructions 124 may execute a MPCAPI 142, a MMCA 140, a MFPIP 138, a video frame user presence detection system 144, the unusual movement detection system 146, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, main memory 104, and static memory 106, may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the video frame user presence detection system 144, unusual movement detection system 146, MPCAPI 142, MMCA 140, MFPIP 138, various post processing AV processing instruction modules for the MMCA 140, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the video frame user presence detection system 144, MPCAPI 142, MMCA 140, MFPIP 138, may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The video frame user presence detection system 144, unusual movement detection system 146, MPCAPI 142, MMCA 140, and/or MFPIP 138, may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system, one or more drive units 118, a GPU, VPU, or GNA, the video/graphic display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

The information handling system 100 may also include a sensor 150 or a plurality of sensors that may be operably connected to the bus 108. The sensor 150 may be associated with computer readable medium 122 that may also contain or access space for data storage in order to store, at least temporarily, data descriptive of the characteristics of a video frame of and during a video conference session executed by the MMCA 140 or characteristics of an environment the remote participant is present within near the information handling system. The sensors 150 may be operatively coupled to a sensor driver 152 to be executed by the processor 102 in order to enable an operating system of the information handling system 100 and other computer programs to access hardware functions of the input/output devices 112.

The sensors 150 may, according to the embodiments of the present specification, perform tasks related to detecting an ambient light around a participant of the video conference session and color vectors and shading in the video frame during a video conference session executed by a MMCA 140. In an embodiment, the sensors 150 may include an ambient light sensor (ALS) to detect the ambient light around the participant or remote participant of the video conference session. In an embodiment, the sensors 150 may include a color sensor to detect color vectors and shading in any number of video frames or at or around the remote participant during the video conference session executed by a MMCA 140. In an embodiment, the video camera 114 (e.g., a webcam) itself may be viewed as a type of sensor 150 when producing or streaming video in real time through the information handling system 100 to other remote participants engaged in the video conference session executed by the MMCA 140. The sensors of the AV processing instruction modules such as those described in connection with FIG. 3 (e.g., 381-388) may use this sensor data to adjust their operations as described herein. In an embodiment, the video camera 114 may be associated with or incorporate a distance sensor (e.g., an infrared light sensor or a TOF sensor 148) or vison engine systems using one or more video cameras 114 or IR cameras that senses a distance an object is away from the camera. In an embodiment, the video camera 114 may be operatively coupled to a MFPIP 138 that receives distance sensor data from the distance sensor and executes an outline detector AV processing instruction module executed by the video processing device to detect an outline of a body of the remote participant to delineate between where a boundary between the image of the remote participant and the virtual background exists. According to an embodiment, of the present specification, the HOP heat map generated by the processor 102 may also facilitate an efficient detection of this outline of the remote participant by reducing the number of video frame slices to be analyzed while the outline detector AV processing instruction module is being executed. This increases the speed at which the outline of the remote participant is detected while concurrently reducing the processing resources used to accomplish this process. With the outline of the remote participant's body detected in each video frame, the color and lighting of a virtual background and an image of a remote participant in any video frame may be adjusted accordingly to also increase the visual composition of each video frame.

As mentioned herein, information handling system 100 may further include an MMCA 140 in an embodiment. The MMCA 140 may be any application that, when executed by the processor 102, initiates a video conference session between a plurality of users such as between the user of the information handling system 100 and another remote user of another information handling system. MMCA 140 may utilize an MMCA central facility server to engage in the video conference. With the MFPIP 138 and MPCAPI 142, the MMCA 140 may transmit to the MFPIP 138 default settings for such processing, reprocessing, encoding, decoding, capture, and display (e.g., via bus 108) of the video frames and present each video frame to the user at the video/graphic display device 110. Examples of a MMCA 140 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The information handling system 100 may also include a MFPIP 138. The MFPIP 138 may be any video processing system of the information handling system 100 that applies any number of AV processing instruction modules the each of the video frames created as the video camera (e.g., webcam) provides those video frames to the video conference session executed by the MMCA 140. In an embodiment, the MFPIP 138 receives a stream of video frames and, via application of these AV processing instruction modules, adjusts the lighting and color vectors and shading of each of the images as described herein. The MFPIP 138 may also detect the activation or deactivation of a virtual background and adjusts the lighting and color vectors and shading of the video frames.

In the present application, the MFPIP 138 may further assist the processor 102 to execute the video frame user presence detection system 144. The video frame user presence detection system 144 may include any module or algorithm such as a video frame user presence detection module (FIG. 3, 381) to, when executed by the processor 102, detect the presence of a remote participant or a remote participant's body part within a slice of a vide frame. The unusual movement detection system 146, in an embodiment, may include any module or algorithm such as an unusual motion detection (UMD) processing instruction module that, when executed by the processor 102, causes the AV processing instruction manager 341 to review, over a plurality of video frames, any changes to the position of the HOP video frame slice group. In an embodiment, the execution of the unusual movement detection system 146 may cause the delta HOP heat map to be created as described herein. During operation of the MFPIP 138, the MFPIP 138 may receive a stream of video frames from the video camera driver 136 of the video camera 114. The processor 102 may then evaluate each video frame and, with the execution of the video frame user presence detection system 144, slice each video frame into a plurality of video frame slices. The processor 102 may further receive distance data from the distance sensor such as the TOF sensor 148, vision engine, or other sensor associated with or included with the video camera 114 and, based on that distance data, create a human object presence (HOP) heat map. This HOP heat map may be used to determine which of the video frame slices the remote participant's body or any portion of the remote participant's body is present.

To create the HOP heat map, the processor 102 executes code of the user presence detection system 144 configured to assign a probability of the presence of the user's body within each video frame slice of the video frame. The processor 102 may do this by executing a human versus object detection (HOD) algorithm that analyzes the distance data associated with each slice of the video frame and assigns an integer value of between 0 and 100, for example, and where a threshold integer value is met, a probability value is assigned to each slice of the video frame. For example, the distance data received from the TOF sensor 148 or other sensor acquired within a first slice of a video frame may indicate that an object is about 610 mm (about 2 feet) from the video camera 114. Similarly, the distance data acquired within a second slice of a video frame may indicate that an object is about 1830 mm (about 6 feet) from the video camera. The HOD algorithm may determine that, in the context of the execution of the MICA 140, the object that is about 610 mm from the video camera 114 indicates a higher probability that a human is present and detected, at least, within the first slice of the video frame. The HOD algorithm may make similar determinations with regard to the second slice of the video frame and, due to the significantly longer distances detected, the 1830 mm distances indicate a wall is present behind the remote participant (and lower probability of a human presence). In an embodiment, where no distance data is found for the second slice, this may indicate that the distance sensor cannot detect either a remote participant or an object behind the remote participant (e.g., any wall, if present, is too far behind the remote participant to be detected) and the processor 102 executing the HOD algorithm may determine that the other slices (e.g., the first slice) includes a human image.

During execution of the HOD algorithm by the processor 102, in an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a probability value of, for example 51, based on distance detected is assigned to the first slice of the video frame may indicate a probability of the presence of a human object within that first video frame when the threshold value is assigned to be 50. Thus, in this example embodiment, because the threshold value is set to 50, any object within any given slice with a probability based on distance detection falling in the range of 51-100 may be indicated by the execution of the HOD algorithm by the processor as being a human object, while any object within any given slice falling in the range of 0-50 may not be indicated as being a human object.

In an alternative embodiment, the distance data associated with each slice of the video frame may be compared to each other and the threshold distance may be calculated based on distance data among all of the slices of the video frames using a different scale where the highest value is set to be the location of the video camera 114. In this embodiment, a scale may be created where the shortest distance data is not detected and instead the location of the video camera 114 is assigned the highest value (e.g., 100). The execution of the HOD algorithm by the processor 102 may cause the assignment of the longest distance data detected among all distance data in each slice as the lowest value (e.g., 0). In this embodiment, a distance-based probability value of, for example 51, assigned to the first slice of the video frame may indicate a probability of the presence of a human object within that first video frame when the threshold value is assigned to be 50. Thus, in this example embodiment, because the threshold value is set to 50, any object within any given slice falling in the range of 51-100 may be indicated by the execution of the HOD algorithm as being a human object while any object within any given slice falling in the range of 0-50 may not be indicated as being a human object. In this embodiment, therefore, the distance between the video camera 114 and a background of the remote participant may be the initial scaling distance used to determine whether any intermediate objects such as parts of the remote participant's body are detected.

In any scaling example described herein, the execution of the HOD algorithm by the processor 102 allows the processor 102 to assign a value or probability value to each slice of the video frame. Again, a probability threshold value may be assigned to each slice of the video frame indicating a probability of presence of the remote participant's body within each respective slice. From this data, the HOP heat map is generated by the video frame user presence detection system 144.

The generation of the HOP heat map allows the processor 102 executing the video frame user presence detection system 144 to designate a HOP video frame slice group that groups together each slice of the video frame where the presence of the remote participant's body has been detected (e.g., distance data exceeds a threshold value). By grouping a number of slices together to create the HOP video frame slice group, the video frame user presence detection system 144 may know where, within the video frame, the remote participant's image resides. During video conferencing sessions, the remote participant usually sits in front of the video camera 114 anywhere from 2 to 3 feet from the video camera 114. As such, the video frame includes an image of the remote participant's body (usually from the chest up) with a background behind the remote participant. The image of the remote participant may be considered the most important part of the video frame and, according to the embodiments described herein, may be encoded differently than those slices of the video frame that are not included as being part of the HOP video frame slice group. In an embodiment, the HOP video frame slice group may be encoded using a first encoding algorithm by the encoding AV processing instruction module (e.g., 383 in FIG. 3) that may be more robust in error concealment for lost packets but require higher computing resources. Those slices falling outside of the HOP video frame slice group may be encoded using a second encoding algorithm by the encoding AV processing instruction module (e.g., 383 in FIG. 3) having a lower computational burden than the first encoding algorithm. This allows the processor to encode slices of the video frame differently such that processing resources are reserved while the visual composition of the remote participant's image within video frames is not compromised while less emphasis for encoding effort is allocated to probable background portions of the video frame.

In order to properly decode the encoded video frame, the sink information handling system receiving the video frames may be provided with data associated with the HOP heat map and its HOP video frame slice group created by the processor 102. This data may include, among others, data describing the number of slices of the video frame, those slices that fall within the HOP video frame slice group, those slices that fell outside of the HOP video frame slice group (may be determined by default), the encoding algorithm used by the source information handling system 100 to encode the HOP video frame slice group, and the encoding algorithm used by the source information handling system 100 to encode the slices not present within the HOP video frame slice group. This allows the sink information handling system to properly decode the video frame as the stream of video frames is sent to the sink information handling systems from the information handling system 100.

The data associated with the HOP heat map and its HOP video frame slice group may, in an embodiment, be sent to the sink information handling systems prior to or concurrently with the video frames associated with the HOP heat map and its HOP video frame slice group. In an embodiment, the data associated with the HOP heat map and its HOP video frame slice group may be sent to these sink information handling systems using an out-of-band (OOB) communication method over an OOB communication link. In an embodiment, the OOB communication link may be different from the communication link used by the information handling system 100 to send the video frames to the sink information handling systems engaged in the video conferencing session.

In addition to sending data associated with the HOP heat map and its HOP video frame slice group for an initial video frame in an alternate embodiment, the information handling system 100 may also send to the sink information handling systems a data descriptive of a delta HOP heat map for subsequent video frames. The delta HOP heat map may describe changes in position of the human image within the plurality of video frame slices over a plurality of video frames captured by the video camera. In a specific embodiment, the delta HOP heat map may include data descriptive of only those changes in the subsequent video frame as compared to the originally sent HOP heat map. In this embodiment, the HOP video frame slice group may change location and size within any given video frame. This delta HOP heat map may describe these changes to the HOP video frame slice group as the remote participant, for example, moves left, right, forward, or backwards during the video conferencing session. Similar to the data associated with the HOP heat map and its HOP video frame slice group, the data associated with the delta HOP heat map and adjusted HOP video frame slice group may be sent to the sink information handling systems before or concurrently with the video frames being sent. By subsequently sending the delta HOP heat map instead of a new HOP heat map for each video frame, the processing resources used to encode and decode the video frame may be further reduced and the data transmitted to describe the HOP heat map is also reduced.

In an embodiment, the data associated with the delta HOP heat map may be sent using an OOB communication method over an OOB communication link. In an embodiment, the OOB communication link may be different from the communication link used by the information handling system 100 to send the video frames to the sink information handling systems engaged in the video conferencing session.

In an embodiment, the data associated with the HOP heat map or delta HOP heat map may be leveraged to lower computations used to initially form the video frames. In an embodiment, this data may be used to lower the processing resources used to form images within those slices that fall outside of the HOP video frame slice group. In an embodiment, the data associated with the HOP video frame slice group may also be used to help to reduce the processing resources used to create that image data in frame slices that fall outside of the HOP video frame slice group in a subsequently generated video frame.

In an example, the methods described herein may also include an optimization of the quality of the video frames produced by the video camera 114 (e.g., webcam) and used during the video conference session executed by the MMCA 140. This optimization process may be used to change the color vectors, shading, lighting, and background of the video frames using any of a plurality of AV processing instruction modules to do so. These AV processing instruction modules may be created by using individual video frames as input into a neural network and, via an integrated feedback loop and/or machine learning system, produce as output optimized settings for executing these AV processing instruction modules. In an embodiment, the information handling system 100 may include this neural network used to optimize or adjust settings for these AV processing instruction modules. In some embodiments, these AV processing instruction modules are developed remotely and operated remotely from the information handling system 100 and the output optimized settings are transmitted to the AV processing instruction modules by these remote systems to the information handling system 100. In embodiment, the video frames produced by the video camera 114 of the information handling system 100 are used as specific input to the integrated feedback loop and/or machine learning system in order to develop setting adjustments, of any, to the AV processing instruction modules used in the presently described system and method. In an embodiment, any video frames or even still images may be used to develop the neural network output setting adjustments to the AV processing instruction modules used in the presently described system and method. Wherever this feedback loop and/or machine learning system is located, the feedback loop and/or machine learning system and method may provide specific types of adjustments to one or more AV processing instruction modules used by the processor 102 or any other processing device associated with the MFPIP 138 to adjust the color vectors and shading, lighting, and background of the streaming video frames received at the MFPIP 138.

In an embodiment, the information handling system 100 includes a MPCAPI 142. The MPCAPI 142 in an embodiment may operate to facilitate communication between various applications, controllers, and drivers of the information handling system 100 in an embodiment. For example, the MPCAPI 142 may interface between the MFPIP 138 and the sensors 150 such as the video camera 114, the distance sensor associated with the video camera 114, the ALS, and the CRGB, among others. The MPCAPI 142 may, during operation of the information handling system 100, receive the individual video frames and direct the AV processing instruction modules and the video frame user presence detection module to be applied. In an embodiment, the MPCAPI 142 may conduct an offloading process where the MPCAPI 142 selects among a plurality of processing resources to apply these AV processing instruction modules to each frame. For example, instead of using the processing resources associated with the processor 102, the MPCAPI 142 may direct a graphical processing unit (GPU), vision processing unit (VPU), gaussian neural accelerator (GNA) control logic or some combination of the same to process this data. This may allow for the processor 102 to engage in other processing activities during the video conference session executed by the MMCA 140. Still further, the MPCAPI 142 may cause data from each of the sensors 150 and the video camera 114, via the sensor drivers 136 and video camera driver 136, to be sent to this other processing resource at the MFPIP 138.

In an embodiment, the MFPIP 138, MMCA 140, and MPCAPI 142, may communicate with the main memory 104, the processor 102, the video/graphic display device 110, a keyboard, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
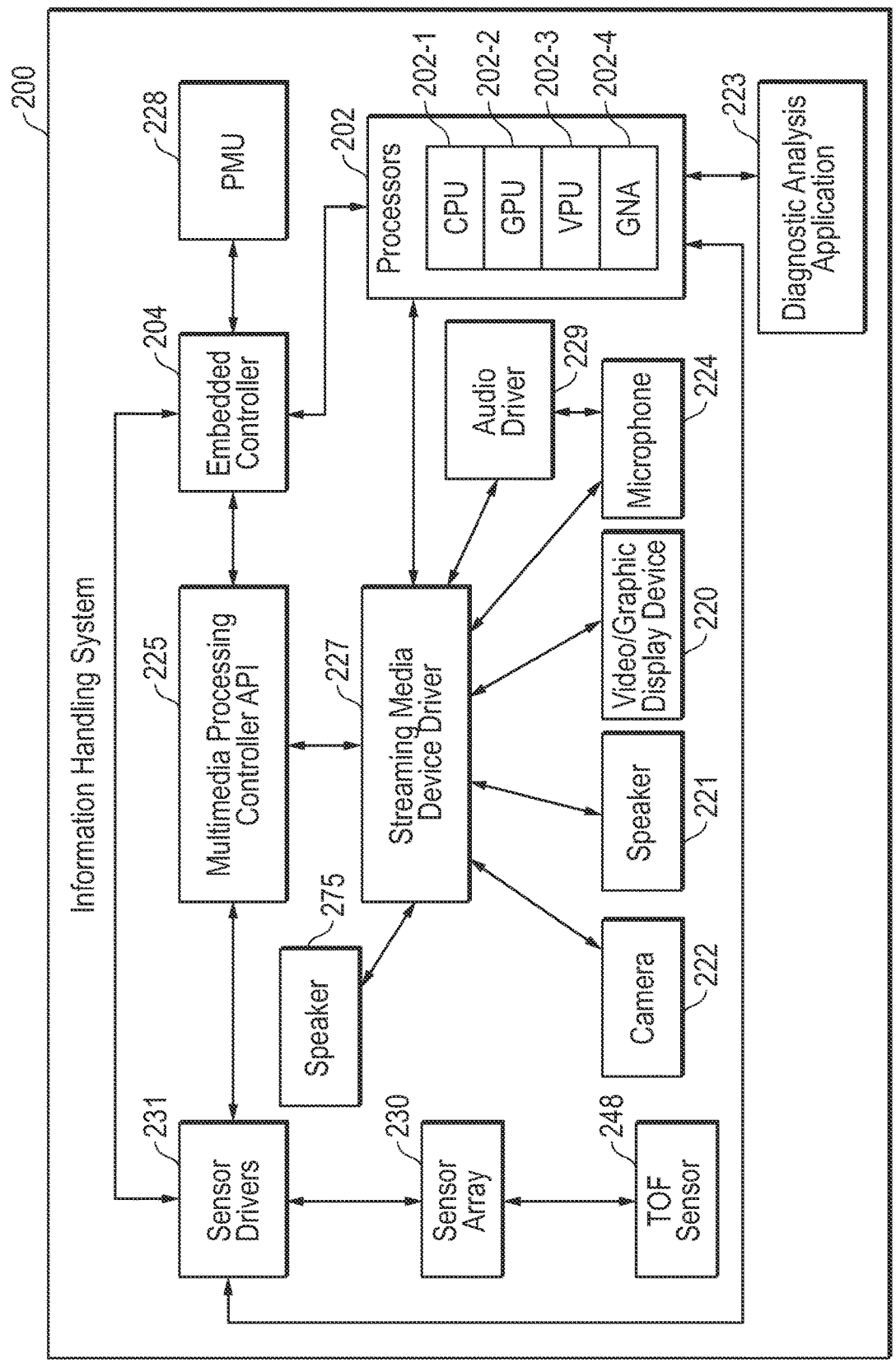
FIG. 2 is a block diagram illustrating various drivers and processors in communication with a plurality of peripheral devices of an information handling system according to an embodiment of the present disclosure.

FIG. 2 is a block diagram illustrating various drivers and processors 202 in communication with a plurality of peripheral devices of an information handling system according to an embodiment of the present disclosure. FIG. 2 shows the operative couplings of a number of devices and processes present and executed within the information handling system 200 during operation of the information handling system 200, which may represent a source information handling system or a sink information handling system, according to various embodiments described herein. During operation, the information handling system 200 may be powered on via use of an on switch on the PMU 228. The PMU 228 may power on an embedded controller 204 that, in an embodiment, executes a basic input/output system (BIOS) and, in an embodiment, an operating system (OS).

As described herein, the information handling system 200 may include a MPCAPI 225. The MPCAPI 225, in an embodiment, may operate to facilitate communication between various applications, controllers, and drivers of the information handling system 200 in an embodiment. For example, the MPCAPI 225 may interface between a MFPIP and the sensors of the sensor array 230 such as the video camera, an ambient light sensor (ALS), a color sensor (CRGB), and the TOF sensor 248, among others. The MPCAPI 225 may, during operation of the information handling system 200, receive the individual video frames and direct the video frame user presence detection module, unusual movement detection processing instruction module, and any other AV processing instruction modules to be applied to each video frame. For example, in an embodiment in which the information handling system 200 is operating as a source information handling system, the MPCAPI 225 may receive individual video frames of a participant of a videoconference located remotely from the user of a sink information handling system. This participant and user of the source information handling system may be referred to herein as the remote participant. The MPCAPI 225 of the source information handling system (e.g., 200) in such an embodiment may direct the video frame user presence detection module, unusual movement detection processing instruction module, and any other AV processing instruction modules (e.g., encoding module) to be applied to each video frame capturing an image of the remote participant or other surroundings of the source information handling system (e.g., 200).

The streaming media driver 227, in such an embodiment, may receive video or audio samples captured by peripheral cameras 222 or microphones 224 in communication therewith, according to default or optimized media capture instructions. For example, in an embodiment in which the information handling system 200 is a source information handling system, the peripheral camera 222 may capture images of the remote participant and other surroundings of the source information handling system (e.g., 200), and the microphones 224 may record audio surrounding the source information handling system (e.g., 200). In an embodiment, the audio driver 229 may receive audio samples captured by the microphone 224 in communication therewith, according to such received media capture instructions. In such an embodiment, the audio driver 229 may operate as a mini-driver or child device to the parent device streaming media driver 227. The streaming media device driver 227 may be in communication with an AV processing instruction manager via one or more ports (e.g., as described in greater detail with respect to the device proxy 445 of FIG. 4) such that video or audio samples received by the streaming media device driver 227 may be transmitted to an AV processing instruction manager, in an embodiment. The audio driver 229 may be in communication with the AV processing instruction manager such that audio samples received by the audio driver 229 may be transmitted to the AV processing instruction manager (e.g., via the audio processing engine, or via the streaming media driver, for example) in an embodiment. In such a way, the AV processing instruction manager may direct retrieval of a video sample captured at a video camera 222 operably connected to information handling system 200 and retrieval of an audio sample captured at a microphone operably connected to information handling system 200.

During operation, the processor 202 may acquire distance data from a distance sensor such as the TOF sensor 248. For example, in an embodiment in which the information handling system 200 is operating as a source information handling system, the processor 202 of the source information handling system (e.g., 200) may acquire distance data describing a distance between the camera 222 and a remote participant user of the source information handling system (e.g., 200) from the TOF sensor 248. This distance data may be used to create a human object presence (HOP) heat map. This HOP heat map may be used to determine which of the video frame slices the remote participant's body or any portion of the remote participant's body is present according to various embodiments herein.

To create the HOP heat map, the processor 202 of a source information handling system (e.g., 200) in such an embodiment executes code of the unusual movement detection system 146, which may be configured to assign a probability of the presence of the remote participant's body within each video frame slice of the video frame. The processor 202 may do this by executing a human versus object detection (HOD) algorithm that analyzes the distance data associated with each slice of the video frame and assigns an integer value of between 0 and 100, for example, and where a threshold integer value is met, a probability value is assigned to each slice of the video frame. For example, the distance data received from the TOF sensor 148 or other sensor acquired within a first slice of a video frame may indicate that an object is about 610 mm (about 2 feet) from the video camera 222. Similarly, the distance data acquired within a second slice of a video frame may indicate that an object is about 1830 mm (about 6 feet) from the video camera. The HOD algorithm may determine that, in the context of the execution of the MMCA, the object that is about 610 mm from the video camera 222 indicates a higher probability that a human is present and detected, at least, within the first slice of the video frame. The HOD algorithm may make similar determinations with regard to the second slice of the video frame and, due to the significantly longer distances detected, the 1830 mm distances indicate a wall is present behind the remote participant (and lower probability of a human presence). In an embodiment, where no distance data is found for the second slice, this may indicate that the distance sensor cannot detect either a remote participant or an object behind the remote participant (e.g., any wall, if present, is too far behind the remote participant to be detected) the HOD algorithm may determine that the other slices (e.g., the first slice) includes a human image.

During execution of the HOD algorithm by the processor 202 of a source information handling system (e.g., 200) in such an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a probability value of, for example 51, based on distance detected is assigned to the first slice of the video frame may indicate a probability of the presence of a human object within that first video frame when the threshold value is assigned to be 50. Thus, in this example embodiment, because the threshold value is set to 50, any object within any given slice with a probability based on distance detection falling in the range of 51-100 may be indicated by the HOD algorithm as being a human object, while any object within any given slice falling in the range of 0-50 may not be indicated as being a human object. The present specification contemplates that the threshold value may be set to any value and, in some embodiments, may be set by the remote participant based on where the camera 222 is placed relative to the remote participant as well as the surrounding environment the remote participant is in.

In an alternative embodiment, the distance data associated with each slice of the video frame may be compared to each other and the threshold distance may be calculated based on distance data among all of the slices of the video frames using a different scale, where the highest value is set to be the location of the video camera 222. In this embodiment, a scale may be created where the shortest distance data is not detected and instead the location of the video camera 222 is assigned the highest value (e.g., 100). The HOD algorithm may then assign the longest distance data detected among all distance data in each slice as the lowest value (e.g., 0). In this embodiment, a distance-based probability value of, for example 51, assigned to the first slice of the video frame may indicate a probability of the presence of a human object within that first video frame when the threshold value is assigned to be 50. Thus, in this example embodiment, because the threshold value is set to 50, any object within any given slice falling in the range of 51-100 may be indicated by the HOD algorithm as being a human object, while any object within any given slice falling in the range of 0-50 may not be indicated as being a human object. In this embodiment, therefore, the distance between the video camera 222 and a background of the remote participant may be the initial scaling distance used to determine whether any intermediate objects such as parts of the remote participant's body are detected. Again, the present specification contemplates that the threshold value may be set to any value and, in some embodiments, may be set by the remote participant based on where the camera 222 is placed relative to the remote participant as well as the surrounding environment the remote participant is in.

In any scaling example described herein, the execution of the HOD algorithm by the processor 202, allows the processor 202 to assign a value or probability value to each slice of the video frame. Again, a probability threshold value may be assigned to each slice of the video frame indicating a probability of presence of the remote participant's body within each respective slice. From this data, the HOP heat map is generated by the video frame remote participant presence detection system 144 executing at the source information handling system (e.g., 200).

The generation of the HOP heat map allows the processor 202 of the source information handling system (e.g., 200) executing the video frame user presence detection system 144 to designate a HOP video frame slice group that groups together each slice of the video frame where the presence of the remote participant's body has been detected (e.g., where distance data exceeds a threshold value). By grouping a number of slices together to create the HOP video frame slice group, the video frame user presence detection system 144 may know where, within the video frame, the remote participant's image resides. During video conferencing sessions executed by the MMCA of the source information handling system (e.g., 200), the remote participant usually sits in front of the video camera 222 anywhere from 2 to 3 feet from the video camera 222. The microphone 224 may also be placed nearby to acquire voice data. Because of the placement of the video camera 222, the video frame includes an image of the remote participant's body (usually from the chest up) with a background behind the remote participant. The image of the remote participant may be considered the most important part of the video frame and, according to the embodiments described herein, may be encoded at the source information handling system (e.g., 200) differently than those slices of the video frame that are not included as being part of the HOP video frame slice group. In an embodiment, the HOP video frame slice group may be encoded at the source information handling system (e.g., 200) using a first encoding algorithm by the encoding AV processing instruction module (e.g., 383 in FIG. 3) those slices falling outside of the HOP video frame slice group may be encoded using a second encoding algorithm by the encoding AV processing instruction module (e.g., 383 in FIG. 3) having a lower computational burden than the first encoding algorithm. This allows the processor 202 of the source information handling system (e.g., 200) to encode slices of the video frame differently such that processing resources are reserved while the visual composition of the remote participant's image within video frames is not compromised. Some of these encoding processes may be orchestrated through the MPCAPI 225 of the source information handling system (e.g., 200) as described herein while less emphasis for encoding effort is allocated to probable background programs.

In order to properly decode the encoded video frame, a sink information handling system may be provided with data associated with the HOP heat map and its HOP video frame slice group created by the processor 202 of the source information handling system (e.g., 200). This data may include, among others, data describing the number of slices of the video frame, those slices that fall within the HOP video frame slice group, those slices that fall outside of the HOP video frame slice group (may be determined by default), the encoding algorithm used by the source information handling system (e.g., 200) to encode the HOP video frame slice group, and the encoding algorithm used by the source information handling system (e.g., 200) to encode the slices not present within the HOP video frame slice group. This allows the sink information handling system to properly decode the video frame as the stream of video frames are sent to the sink information handling systems from the information handling system (e.g., 200).

The data associated with the HOP heat map and its HOP video frame slice group may, in an embodiment, be sent to the sink information handling system from the source information handling system (e.g., 200) prior to or concurrently with the video frames associated with the HOP heat map and its HOP video frame slice group. In an embodiment, the data associated with the HOP heat map and its HOP video frame slice group may be sent to the sink information handling system using an out-of-band (OOB) communication method over an OOB communication link initiated by, for example, the embedded controller 204 and in communication with an information handling system performance optimizer application (e.g., FIG. 5, 575). In an embodiment, the OOB communication link may be different from the communication link used by the source information handling system (e.g., 200) to send the video frames to the sink information handling system also engaged in the video conferencing session.

In addition to sending data associated with the HOP heat map and its HOP video frame slice group for an initial video frame in an alternate embodiment, the source information handling system may also send to the sink information handling system data descriptive of a delta HOP heat map for subsequent video frames. The delta HOP heat map may describe changes in position of the human image within the plurality of video frame slices over a plurality of video frames captured by the video camera 222 of the source information handling system (e.g., 200). In this embodiment, the HOP video frame slice group may change location and size within any given video frame. This delta HOP heat map may describe these changes to the HOP video frame slice group as the remote participant, for example, moves left, right, forward, or backwards during the video conferencing session. Similar to the data associated with the HOP heat map and its HOP video frame slice group, the data associated with the delta HOP heat map and adjusted HOP video frame slice group may be sent to the sink information handling system before or concurrently with the video frames being sent. In an embodiment, the data associated with the delta HOP heat map may be sent using an OOB communication method over an OOB communication link. In an embodiment, the OOB communication link may be different from the communication link used by the source information handling system (e.g., 200) to send the video frames to the sink information handling system engaged in the video conferencing session.

During the operation of the information handling system 200, drivers may be executed by the processor 202 to enable an OS of the information handling system 200 and other computer programs to access hardware functions of the input/output devices, sensors of the sensor array 230 such as the TOF sensor 248, and the video camera 222, among others. These drivers working through a streaming media device driver 227 may help to facilitate the transmission of data from the individual sensors to the processor 202 or other processing device responsible for creating the HOP heat map and delta HOP heat map as described herein.

In an embodiment, the information handling system 200 may include a microphone 224 that provides audio input to the video conference session along with the video input from the video camera 222. The audio may be provided to any user engaged in the video conference session in real-time to facilitate the interaction between the users over the network.

As described herein, the information handling system 200 may also operate as a sink information handling system in an embodiment. In such an embodiment, the sink information handling system (e.g., 200) may receive encoded video or audio frames of a remote participant user of a source information handling system. In an embodiment, these encoded video or audio frames may have been encoded at the source information handling system based on HOP heat maps also generated at the source information handling system and described directly above. In such an embodiment, the sink information handling system (e.g., 200) may also receive a plurality of HOP heat maps generated at the source information handling system, with each HOP heat map corresponding to a video frame received at the sink information handling system (e.g., 200).

The sink information handling system (e.g., 200) in an embodiment may also receive data assigning a subset of the video frame slices as falling within the HOP video frame slice group or falling outside the HOP video frame slice group. The sink information handling system (e.g., 200) in such an embodiment may identify a first decoding algorithm corresponding to the first encoding algorithm used by the source information handling system, and identify a second decoding algorithm corresponding to the second encoding algorithm used by the source information handling system. In such an embodiment, the sink information handling system (e.g., 200) may decode the video frame slices falling within the HOP video frame slice group using the first decoding algorithm and decode the video frame slices falling outside the HOP video frame slice group using the second decoding algorithm. The first of these decoding algorithms in an embodiment may require less computational resources for execution than the second of these decoding algorithms, resulting in conservation of computational resources for execution of concurrently executing applications, other than the MICA at the sink information handling system (e.g., 200).

In some embodiments, the sink information handling system may receive updated assignments of a subset of the video frame slices comprising the video frame as falling within or outside the HOP video frame slice group for each video frame received in a streaming video feed. In such an embodiment, the sink information handling system may repeat the process described directly above for each video frame so received in order to limit the processing resources consumed continuously throughout the videoconference session.

The sink information handling system (e.g., 200) in an embodiment may also receive a delta HOP heat map generated at the source information handling system indicating when the remote participant has shifted positions within the encoded video frames. Each time the remote participant's position within the encoded video frames shifts, the remote participant's presence may be detected in portions of the video frame in which the remote participant's presence was previously undetected, or vice versa. As such, some video frame slices may move from falling within the HOP video frame slice group to falling outside the HOP video frame slice group or may move from falling outside the HOP video frame slice group to falling inside the HOP video frame slice group. Thus, the processor 202 of the sink information handling system (e.g., 200) in such an embodiment may use the delta HOP heat map to determine when assignment of various video frame slices has occurred, rather than referring to the assignments associated with each video frame as it is received, as described directly above. In such an embodiment, the sink information handling system may refer to the delta HOP heat map associated with each newly received video frame to determine whether any changes in the remote participant's position within the newly received video frame have occurred. When the delta HOP heat map for the newly received video frame indicates a change in the remote participant's position, this may indicate that some video frame slices may have moved from falling within the HOP video frame slice group to falling outside the HOP video frame slice group or vice versa. Thus, in such an embodiment, the sink information handling system may set the assignments of the HOP video frame slice group for the newly received video frame as the current or default HOP video frame slice group assignment. By only updating these assignments of certain video frame slices as falling within or outside the HOP video frame slice group when a change in the user's position has been detected, the sink information handling system may further decrease processing power associated with repeatedly determining which video frame slices fall within or outside the HOP video frame slice group for each received video frame.

Upon decoding of the encoded video frames received at the sink information handling system (e.g., 200) or execution of further video processing modules in an embodiment (e.g., as described with reference to FIGS. 3, 5, and 8), the MPCAPI 225 may transmit the decoded video frames and decoded audio samples to the streaming media device driver 227 of the sink information handling system (e.g., 200). The streaming media device driver 227 may be in communication with an AV processing instruction manager via one or more ports (e.g., as described in greater detail with respect to the device proxy 445 of FIG. 4) such that video or audio samples decoded by the AV processing instruction manager may be transmitted to the streaming media device driver 227, in an embodiment. The streaming media device driver 227 in some embodiments in which the information handling system 200 is operating (at least partially) as a sink information handling system may be in communication with a speaker 221 and a video/graphic display device 220. The video/graphic display device 220 may be used to present decoded video frames, in a streaming manner, to the user for viewing of the other users during the video conferencing session. Audio may also be received at the information handling system 200 via the streaming media device driver 227 and provided at a speaker 275 for real-time audio output to the user. In such a way, the AV processing instruction manager may direct playback of video frames via the video/graphic display device 220 and audio samples via the speaker 221, where the video frames and audio samples have been received from a source information handling system and decoded using two separate decoding algorithms, as described above, to decrease computation resources consumed at the sink information handling system (e.g., 200) and improve response and playback of videoframe images.

Figure 3:
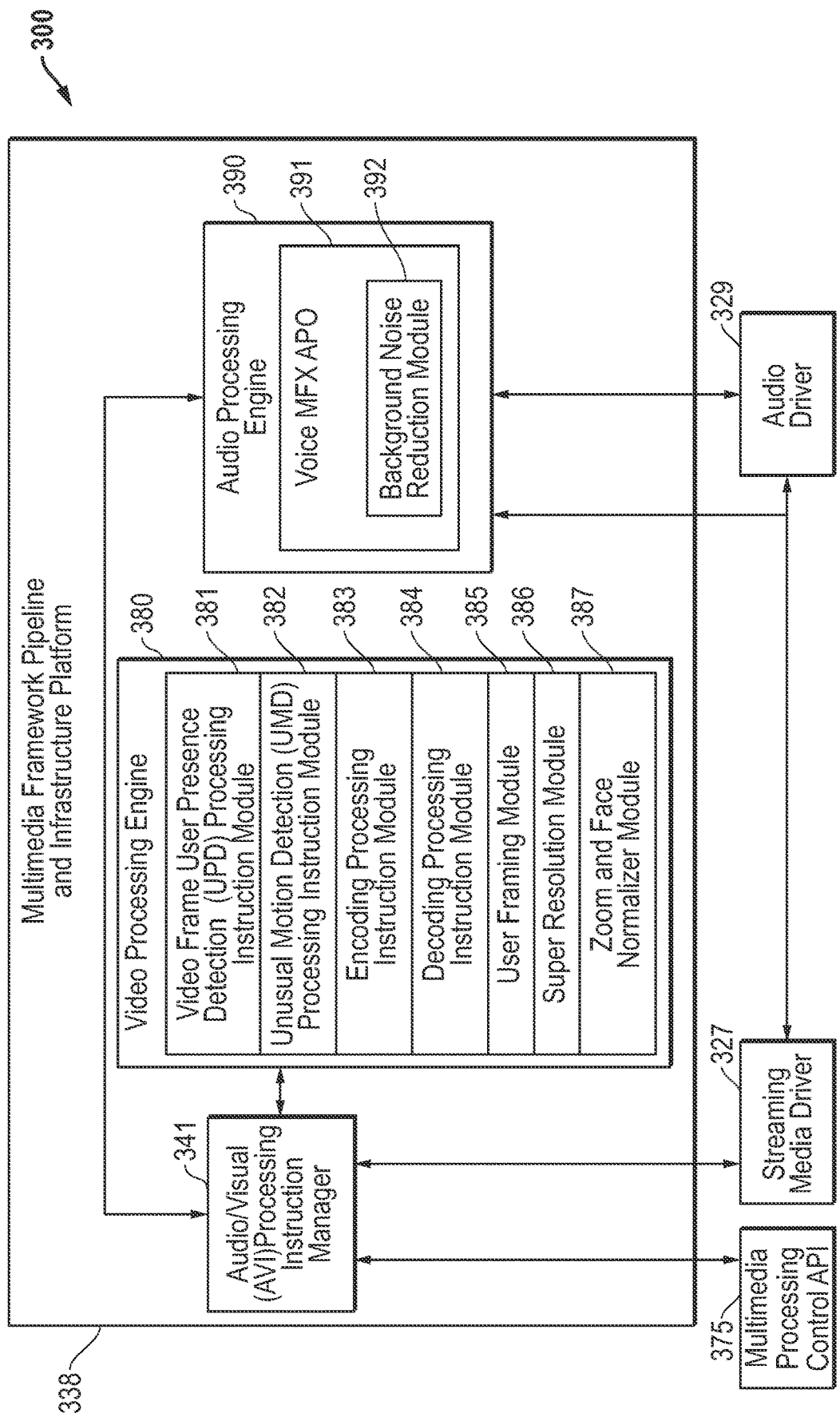
FIG. 3 is a block diagram illustrating a multimedia framework pipeline and infrastructure platform of an information handling system according to an embodiment of the present disclosure.

FIG. 3 is a block diagram illustrating a MFPIP 338 of an information handling system according to an embodiment of the present disclosure. The MFPIP 338, in the present embodiment, may form part of the information handling system such as those described in connection with FIGS. 1 and 2. FIG. 3 shows the multimedia framework pipeline and infrastructure platform executed within the information handling system 300 during operation of the information handling system 300, which may represent a source information handling system or a sink information handling system, according to various embodiments described herein. In another embodiment, the MFPIP 338 may be remote from the information handling system as part of a distributed peer computer system that provides processing of the video frames of the video conference session remotely for a thin-client-type information handling system.

The MFPIP 338 may interface with a number of drivers via streaming media driver 327 of the information handling system as described herein in order to enable an operating system of the information handling system and other computer programs to access the devices used during the execution of the processor of the information handling system. The streaming media driver 327 may be a driver that, when executed by the processor, enables the operating system of the information handling system and other computer programs to distribute the video frames, as encoded/decoded by operation of the MFPIP 338 as described herein.

For example, in an embodiment in which the information handling system 300 is operating as a source information handling system, this data stream provided by the streaming media driver 327 may be sent across a network via, for example, a network interface device of the information handling system as described herein. The streaming media driver 327 in such an embodiment may receive video or audio samples captured by peripheral cameras or microphones in communication therewith, according to default or optimized media capture instructions, as described with reference to FIG. 2. In another aspect of such an embodiment, the audio driver 329 may receive audio samples captured by a microphone in communication therewith, according to such received media capture instructions. In such an embodiment, the audio driver 329 may operate as a mini-driver or child device to the parent device streaming media driver 327. The streaming media driver 327 may be in communication with the AV processing instruction manager 341 via one or more ports (e.g., as described in greater detail with respect to the device proxy 445 of FIG. 4) such that video or audio samples received by the streaming media driver 327 may be transmitted to the AV processing instruction manager 341 in an embodiment. The audio driver 329 may be in communication with the AV processing instruction manager 341 such that audio samples received by the audio driver 329 may be transmitted to the AV processing instruction manager 341 (e.g., via the audio processing engine 390, or via the streaming media driver 327) in an embodiment. In such a way, the AV processing instruction manager 341 may direct retrieval of video samples (e.g., video frames) captured at a camera operably connected to a source information handling system (e.g., 300) and retrieval of an audio samples captured at a microphone operably connected to the source information handling system (e.g. 300).

Figure 4:
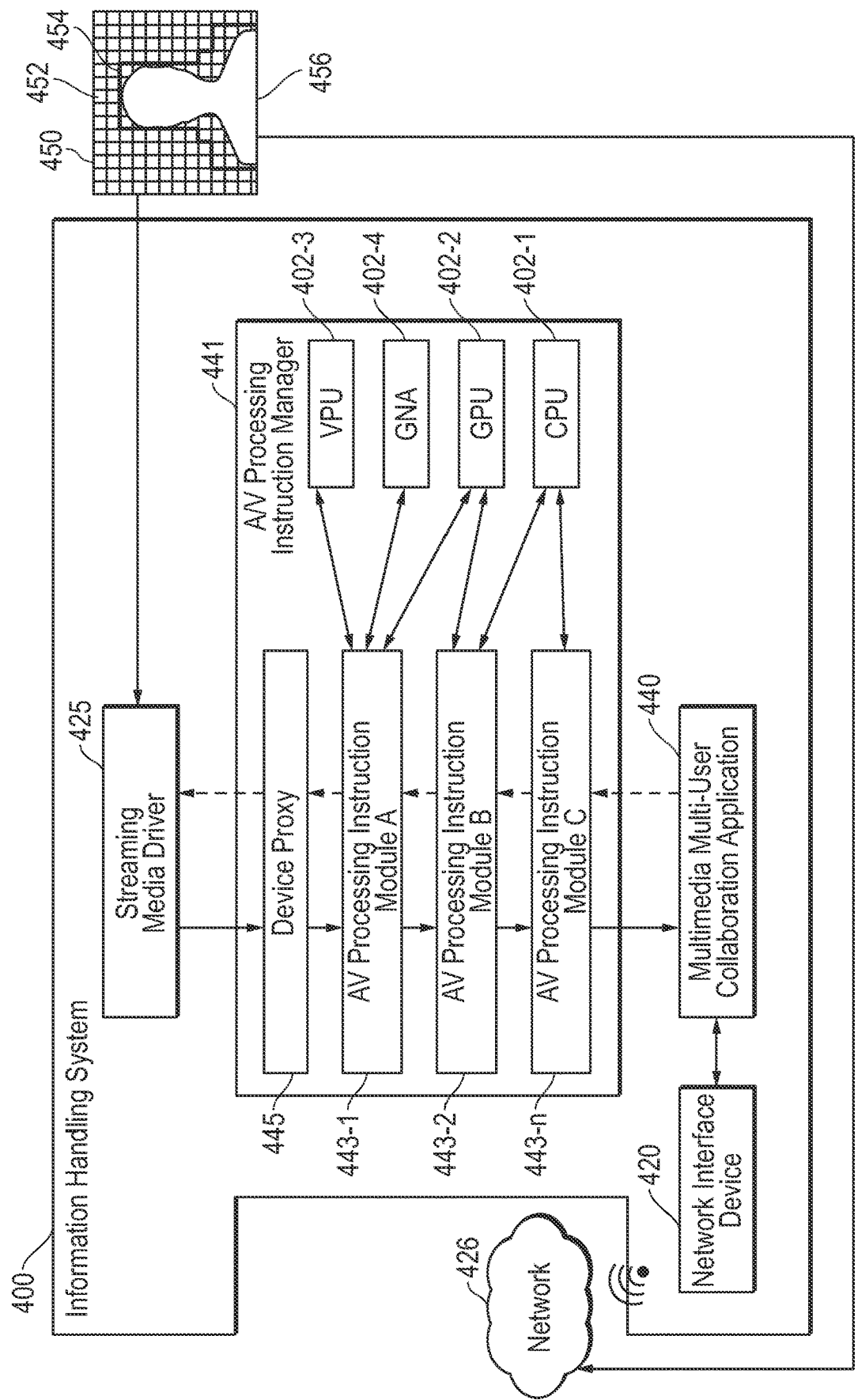
FIG. 4 is a block diagram illustrating audio/visual (AV) processing instruction manager for optimizing information handling system operation of a multimedia, multi-user collaboration application according to an embodiment of the present disclosure.
Figure 5:
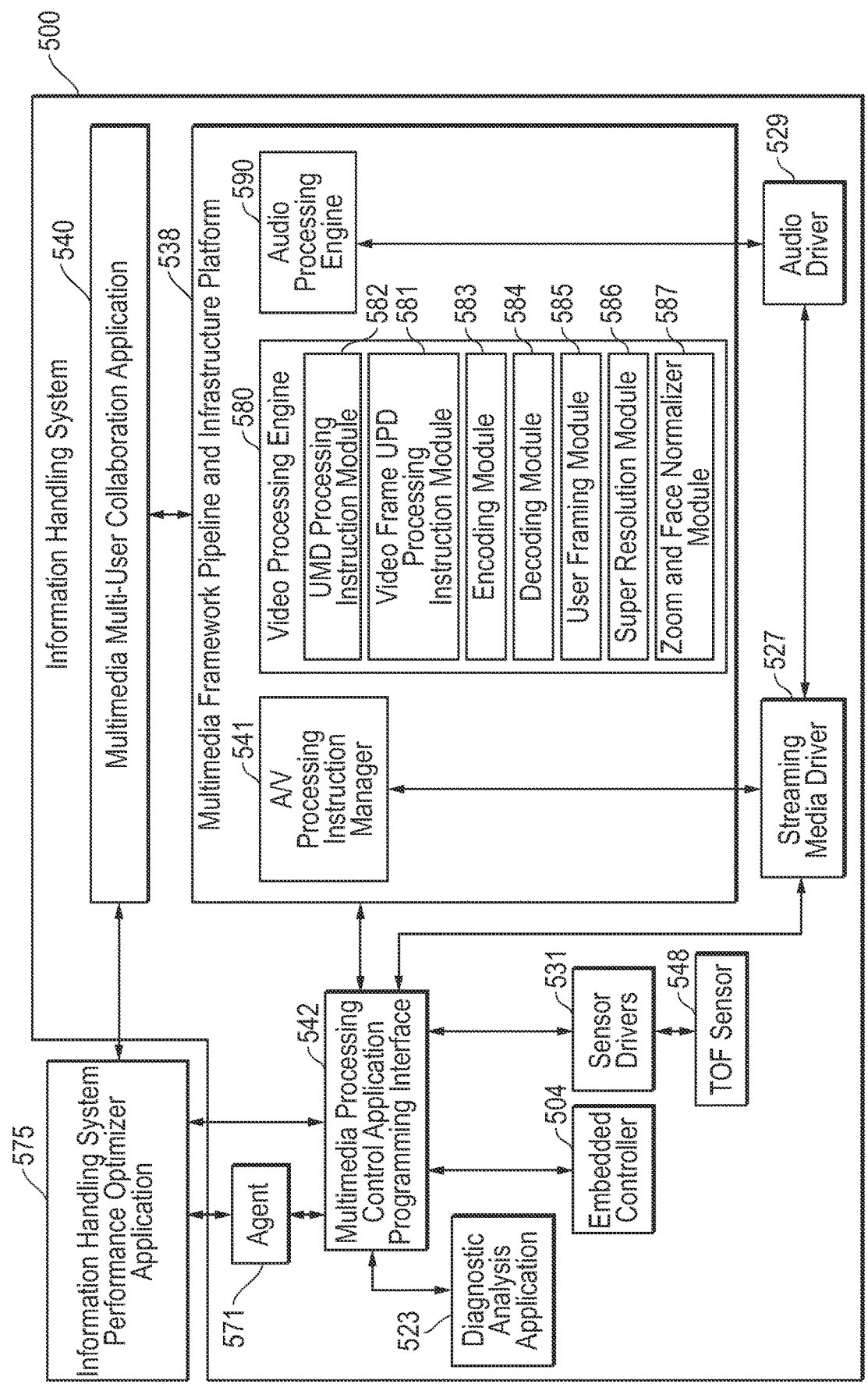
FIG. 5 is a block diagram illustrating a first embodiment of a sink information handling system operation of a multimedia, multi-user collaboration application (MMCA) according to an embodiment of the present disclosure.

As another example, in an embodiment in which the information handling system 300 is operating as a sink information handling system, the streaming media driver 327 may receive the data stream (e.g., encoded video frames and audio samples of a remote participant user of the source information handling system) and any related HOP heat map, HOP video frame slice group assignments, or delta HOP heat map data transmitted by the source information handling system via the MPCAPI, as described in greater detail with respect to FIG. 5, below. The streaming media driver 327 may be in communication with the AV processing instruction manager 341 via one or more ports (e.g., as described in greater detail with respect to the device proxy 445 of FIG. 4) such that encoded video frames received by the streaming media driver 327 may be transmitted to the AV processing instruction manager 341 in an embodiment for decoding or further processing.

The audio driver 329 may interface with the operating system and be executed by the processor in order to drive, for example, a specific audio device such as a microphone and an audio card. The audio driver 329 may, in the embodiments herein, interface with an audio processing engine 390 that includes a voice mode effects audio processing object (MFX APO) 391. The driver may allow the MFX APO 391 to interface with the operating system in order to provide audio during the video conference session executed on the MMCA 140. In an embodiment, the MFX APO 391 provides software based digital signal processing for the video conference session. Examples of a MFX APO 391 include graphic equalizers, reverb, tremolo, Acoustic Echo Cancellation (AEC) and Automatic Gain Control (AGC). In an embodiment, the MFX APO 391 may be COM-based, real-time, in-process objects. During execution of the MFX APO 391, a background noise reduction module 392 or any other audio-based AV processing instruction module may be executed to adjust the audio output during the video conference session.

The MFPIP 338 may include a driver stack working with the streaming media driver 327 that operates other drivers such as those associated with the sensors. For example, and in the embodiments here, the sensors may include a distance sensor (e.g., TOF sensor), an ALS, and a CRGB that detect the ambient light around the remote participant user of a source information handling system (e.g., ambient luminance and color/temperature). These sensors may help inform, as input, as to how to handle image brightness based on the ambient conditions as well as how to create the HOP heat map or delta HOP heat map at the source information handling system as described herein. The driver stack working with the streaming media driver 327 may therefore be a combination of drivers that plug into each other with each of the drivers adding to a chain of drivers that may be executed in series by the processor. For example, the driver associated with the video camera of the source information handling system (e.g., 300) may be executed prior to any of the sensors so that a video frame may first be obtained prior to the data from the sensors being used to adjust the visual composition of the video frame and create the HOP heat map or delta HOP heat map.

As mentioned, MFPIP 338 may also include an AV processing instruction manager 341. The AV processing instruction manager 341 may be any processor that coordinates operation of the AV processing as described herein and causes one or more AV processing instruction modules to be used to visually transform the one or more video frames during the execution of the video conference session. The AV processing instruction manager may utilize, for example, a CPU, a GPU, a VPU, a GNA or a combination of these processing devices to complete the operations and methods described herein. The AV processing instruction manager 341 may interface with a video processing engine 380 to cause one or more of the video frame user presence detection module 381, unusual motion detection processing instruction module 382, encoding processing instruction module 383, decoding processing instruction module 384, user framing module 385, super resolution module 386, zoom and face normalizer 387, or any other AV processing instruction modules to be executed so as to generate the HOP heat map, generate the delta HOP heat map, or apply the appropriate encoding or decoding algorithms to each video frame generated at the source information handling system according to the principles described herein.

For example, the AV processing instruction manager 341 may receive input from the streaming media driver 327 in the form of streaming AV media files that include, among other data, individual video frames. For example, in an embodiment in which the information handling system 300 is operating as a source information handling system, the AV processing instruction manager 341 may cause the video processing engine 380 to execute the video frame user presence detection module 381. As described herein, the video frame user presence detection module 381, when executed at a source information handling system (e.g., 300), may slice each video frame into a plurality of video frame slices. The number and position of the video frame slices created may be selected to most efficiently detect the presence and non-presence of a remote participant user of the source information handling system (e.g., 300) within the video frame. The AV processing instruction manager 341 of a source information handling system (e.g., 300) in an embodiment may further receive distance data from the distance sensor such as a TOF sensor associated with or included with the video camera and, based on that distance data, create a HOP heat map. This HOP heat map may be used to determine which of the video frame slices the remote participant's body or any portion of the remote participant's body is present.

To create the HOP heat map, the videoframe user presence detection AV processing instruction module 381 of a source information handling system (e.g., 300) may be configured to assign a probability of the presence of the remote participant's body within each video frame slice of the video frame through the execution of the video frame user presence detection processing instruction module 381. The videoframe user presence detection AV processing instruction module 381 of a source information handling system (e.g., 300) for example may do this by executing a HOD algorithm that analyzes the distance data associated with each slice of the video frame and assigns an integer value of between 0 and 100, for example, and where a threshold integer value is met, a probability value is assigned to each slice of the video frame. For example, the distance data received from the TOF sensor 148 or other sensor acquired within a first slice of a video frame may indicate that an object is about 610 mm (about 2 feet) from the video camera. Similarly, the distance data acquired within a second slice of a video frame may indicate that an object is about 1830 mm (about 6 feet) from the video camera. The execution of the HOD algorithm by the videoframe user presence detection AV processing instruction module 381 of a source information handling system (e.g., 300) may determine that, in the context of the execution of the MMCA, the object that is about 610 mm from the video camera indicating a higher probability that a human is present and detected, at least, within the first slice of the video frame. The execution of the HOD algorithm may allow the videoframe user presence detection AV processing instruction module 381 of a source information handling system (e.g., 300) for example to make similar determinations with regard to the second slice of the video frame and, due to the significantly longer distances detected, the 1830 mm distances indicate a wall is present behind the remote participant. In an embodiment, where no distance data is found for the second slice, this may indicate that the distance sensor cannot detect either a remote participant or an object behind the remote participant user of the source information handling system (e.g., any wall, if present, is too far behind the remote participant to be detected) and the videoframe user presence detection AV processing instruction module 381 executing the HOD algorithm may determine that the other slices (e.g., the first slice) includes a human image.

During execution of the HOD algorithm by the processor of a source information handling system (e.g., 300), in an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a probability value of, for example 51 based on distance detected is assigned to the first slice of the video frame may indicate a probability of the presence of a human object within that first video frame when the threshold value is assigned to be 50. Thus, in this example embodiment, because the threshold value is set to 50 any object within any given slice with a probability based on distance detection falling in the range of 51-100 may be indicated by the videoframe user presence detection AV processing instruction module 381 executing the HOD algorithm at a source information handling system (e.g., 300) as being a human object while any object within any given slice falling in the range of 0-50 may not be indicated as being a human object.

In an alternative embodiment, the distance data associated with each slice of the video frame may be compared to each other and the threshold distance may be calculated based on distance data among all of the slices of the video frames using a different scale where the highest value is set to be the location of the video camera. In this embodiment, a scale may be created where the shortest distance data is not detected and instead the location of the video camera is assigned the highest value (e.g., 100). The videoframe user presence detection AV processing instruction module 381 executing the HOD algorithm at a source information handling system (e.g., 300) for example may then assign the longest distance data detected among all distance data in each slice as the lowest value (e.g., 0). In this embodiment, a distance-based probability value of, for example 51, assigned to the first slice of the video frame may indicate a probability of the presence of a human object within that first video frame when the threshold value is assigned to be 50. Thus, in this example embodiment, because the threshold value is set to 50, any object within any given slice falling in the range of 51-100 may be indicated by the videoframe user presence detection AV processing instruction module 381 executing the HOD algorithm as being a human object, while any object within any given slice falling in the range of 0-50 may not be indicated as being a human object. In this embodiment, therefore, the distance between the video camera of a source information handling system (e.g., 300) and a background of the remote participant user of the source information handling system (e.g., 300) may be the initial scaling distance used to determine whether any intermediate objects such as parts of the remote participant's body are detected.

In any scaling example described herein, the execution of the HOD algorithm by the videoframe user presence detection AV processing instruction module 381 of a source information handling system (e.g., 300), allows the videoframe user presence detection AV processing instruction module 381 to assign a value or probability value to each slice of the video frame. Again, a probability threshold value may be assigned to each slice of the video frame indicating a probability of presence of the remote participant's body within each respective slice. From this data, the HOP heat map is generated at a source information handling system (e.g., 300) via execution of the video frame user presence detection processing instruction module 381.

The generation of the HOP heat map allows the videoframe user presence detection AV processing instruction module 381 executing the video frame user presence detection processing instruction module 381 at a source information handling system (e.g., 300) to designate a HOP video frame slice group that groups together each slice of the video frame where the presence of the remote participant's body has been detected (e.g., distance data exceeds a threshold value). By grouping a number of slices together to create the HOP video frame slice group, the videoframe user presence detection AV processing instruction module 381 of a source information handling system (e.g., 300) executing the video frame user presence detection processing instruction module 381 may determine where, within the video frame, the remote participant's image resides. During video conferencing sessions, the remote participant usually sits in front of the video camera of a source information handling system (e.g., 300) anywhere from 2 to 3 feet from the video camera. As such, the video frame includes an image of the remote participant's body (usually from the chest up) with a background behind the remote participant. The image of the remote participant may be considered the most important part of the video frame and, according to the embodiments described herein, may be encoded differently at a source information handling system (e.g., 300) than those slices of the video frame that are not included as being part of the HOP video frame slice group. In an embodiment in which the information handling system 300 is operating as a source information handling system, the HOP video frame slice group may be encoded using a first encoding algorithm upon execution of the encoding processing instruction module 383 by the AV processing instruction manager 341. Additionally, those slices falling outside of the HOP video frame slice group may be encoded using a second encoding algorithm having a lower computational burden than the first encoding algorithm upon execution of the encoding processing instruction module 383 by the AV processing instruction manager 341 executing the encoding AV processing instruction module 383 at the source information handling system (e.g., 300). This allows the AV processing instruction manager 341 of a source information handling system (e.g., 300) to direct encoding of slices of the video frame differently. In such a way, the AV processing instruction manager 341 of a source information handling system (e.g., 300) may reserve processing resources for execution of simultaneously executing (likely background) programs, without compromising the visual composition of the remote participant's image within video frames by consuming fewer processing resources during the video frame encoding process.

The AV processing instruction manager 341 of a source information handling system (e.g., 300) may also create a delta HOP heat map by executing an unusual motion detection processing instruction module 382. The execution of the unusual motion detection processing instruction module 382 of a source information handling system (e.g., 300) causes the AV processing instruction manager 341 to review, over a plurality of video frames, any changes to the position of the HOP video frame slice group. The delta HOP heat map may, therefor, describe changes in position of the human image within the plurality of video frame slices over a plurality of video frames captured by the video camera. In this embodiment, the HOP video frame slice group may change location and size within any given video frame presented at the MFPIP 338. This delta HOP heat map may describe these changes as the remote participant user of the source information handling system (e.g., 300), for example, moves left, right, forward, or backwards during the video conferencing session. Similar to the data associated with the HOP heat map and its HOP video frame slice group, the data associated with the delta HOP heat map may be sent to the sink information handling systems before or concurrently with the video frames being sent. In an embodiment, the data associated with the delta HOP heat map may be sent using an OOB communication method over an OOB communication link. In an embodiment, the OOB communication link may be different from the communication link used by the source information handling system (e.g., 300) to send the video frames to the sink information handling systems engaged in the video conferencing session.

As described herein, the information handling system 300 may also operate as a sink information handling system that receives the video frames of the remote participant user of the source information handling system for playback at the sink information handling system. The data associated with the HOP heat map and its HOP video frame slice group may, in an embodiment, be sent to the sink information handling systems prior to or concurrently with the video frames associated with the HOP heat map, delta HOP heat map, or HOP video frame slice groups. In an embodiment, the data associated with the HOP heat map, delta HOP heat map, or HOP video frame slice group may be sent to the sink information handling system (e.g., 300) using an OOB communication method over an OOB communication link. In an embodiment, the OOB communication link may be different from the communication link used by the sink information handling system (e.g., 300) to receive the video frames.

In order to properly decode any encoded video frames received at such a sink information handling system (e.g., 300), the sink information handling system (e.g., 300) may receive assignments of video frame slices to HOP video frame slice groups created by the source information handling system. The sink information handling system (e.g., 300) in an embodiment may identify a first decoding algorithm corresponding to the first encoding algorithm used by the source information handling system, and identify a second decoding algorithm corresponding to the second encoding algorithm used by the source information handling system. In such an embodiment, the decoding processing instruction module 384 of the sink information handling system (e.g., 300) may decode the video frame slices falling within the HOP video frame slice group using the first decoding algorithm and decode the video frame slices falling outside the HOP video frame slice group using the second decoding algorithm. The first of these decoding algorithms in an embodiment may require less computational resources for execution than the second of these decoding algorithms, resulting in conservation of computational resources for execution of concurrently executing applications, other than the MMCA at the sink information handling system (e.g., 300).

For each decoded video frame, the video frame user presence detection processing instruction module 381 of the sink information handling system (e.g., 300) in an embodiment may use the HOP heat map to determine which of the video frame slices fall within the HOP video frame slice group, and which video frame slices fall outside the HOP video frame slice group. In some embodiments, the sink information handling system (e.g., 300) may also receive a delta HOP heat map generated at the source information handling system indicating when the remote participant has shifted positions within the encoded video frames. Each time the remote participant's position within the encoded video frames shifts, the remote participant's presence may be detected in portions or slices of the video frame in which the remote participant's presence was previously undetected, or vice versa. As such, some video frame slices may move from falling within the HOP video frame slice group to falling outside the HOP video frame slice group or may move from falling outside the HOP video frame slice group to falling inside the HOP video frame slice group.

The unusual motion detection processing instruction module 382 of the sink information handling system (e.g., 300) in such an embodiment may use the delta HOP heat map to determine when assignment of various video frame slices has occurred, rather than processing each HOP heat map to determine which video slices of each video frame fall within the HOP video frame slice group and which video frame slices fall outside the HOP video frame slice group using the HOP heat map. Thus, in an embodiment, the sink information handling system (e.g., 300) may set the assignments of the HOP video frame slice group for the newly received video frame as the current or default HOP video frame slice group assignment. By only updating these assignments of certain video frame slice groups as falling within or outside the HOP video frame slice group when a change in the user's position has been detected, the sink information handling system (e.g., 300) may further decrease processing power associated with repeatedly determining which video frame slices fall within or outside the HOP video frame slice group for each received video frame.

Similarly, the AV processing instruction manager 341 may direct the video processing engine 380 to execute any other AV processing instruction modules to adjust the visual composition of the one or more video frames. For example, the AV processing instruction manager 341 may execute any AV processing instruction modules to adjust the color blending/matching within a video frame, conduct outline detection within the video frames, adjust the luminance/brightness blending within the video frame, and generate a virtual background blur within the video frame, among other image modifications used to increase the visual composition of the video frames.

In a specific embodiment in which the information handling system 300 is a sink information handling system, for example, the AV processing instruction manager 341 may further direct the video processing engine 380 to execute a user framing module 385, a super resolution module 386, or a zoom and face normalizer module 387. The user framing module 385 in an embodiment may operate to identify a user's face and center the user's face within each captured image making up the video sample. Such a process in existing systems may require execution of a facial recognition algorithm, which may be processor intensive. In order to conserve processing resources consumed during this process, the user framing module 385 may leverage the HOP heat map data or delta HOP heat map data received from the source information handling system to avoid execution of a facial recognition algorithm. As described herein, the video frame user presence detection processing instruction module 381 or the unusual motion detection processing instruction module 382 of a sink information handling system 300 may identify (either alone or in combination with one another) a HOP video frame slice group in which user presence has been detected. As also described herein, the sink information handling system (e.g., 300) in an embodiment may receive identification of the HOP video frame slice group in which user presence has been detected for one or more video frames from the source information handling system where these video frames were captured. The user framing module 385 in various embodiments thus described herein may limit processing resources consumed during execution of the algorithm for framing the user's face within each video frame by placing the HOP video frame slice group in which user presence has been detected within the center of the video frame.

In an embodiment, the super resolution module 386 may recover a high-resolution image from a low-resolution image, using a known degradation function. As described herein, the portion of each video frame in which the remote participant appears may be the most important. As such, limiting execution of the super resolution module 386 algorithm to those portions may conserve processing resources consumed without compromising the quality of the portion of video frames in which the remote participant is present. In order to conserve processing resources consumed during execution of the super resolution module 386 in an embodiment, the HOP heat map data or delta HOP heat map data received from the source information handling system may be used to identify the HOP video frame slice group in which the remote participant is present, to avoid execution of the super resolution module 386 algorithm to increase resolution of unimportant background imagery within each video frame.

The zoom and face normalizer module 387 of the sink information handling system (e.g., 300) in an embodiment may operate to crop, enlarge, or scale down various video frames of the remote participant user of the source information handling system to normalize the size of the remote participant's face across each of the video frames received from the source information handling system. In order to conserve processing resources consumed during execution of the zoom and face normalizer 387 in an embodiment, the HOP heat map data, delta HOP heat map, or HOP video frame slice group identification data received from the source information handling system may be used to identify the HOP video frame slice group in which the remote participant is present, and to crop, enlarge, or scale down various video frames such that the portion of each of these video frames in which the remote participant appears (as determined based on the HOP heat map or delta HOP heat map) remains consistent across all video frames.

In some embodiments, the sink information handling system (e.g., 300) may access the HOP heat map data associated with each video frame in order to determine the portion of the video frame that contains the remote participant's body, and thus, to which portion of the video frame data the user framing module 385, super resolution module 386, or zoom and face normalizer module 387 algorithms should be applied. In other embodiments, the sink information handling system (e.g., 300) may streamline this process by referring to the received delta HOP heat map data. For example, the sink information handling system (e.g., 300) may apply the user framing module 385, super resolution module 386, and zoom and face normalizer module 387 algorithms based on the assignment of slices of a first received video frame to the HOP video frame slice group indicated to contain images of the remote participant's body, as defined within the HOP heat map data associated with this first received video frame. In order to avoid repeating this step for each video frame received from the source information handling system, the sink information handling system (e.g., 300) may refer to the delta HOP heat map data associated with each frame. If the delta HOP heat map data associated with a frame does not indicate movement of the remote participant between the last received frame and the current frame, this may indicate the HOP heat map data identifying which slices of the last received frame fall within the HOP video frame slice group may be used to determine which slices of the current frame fall within the HOP video frame slice group. In such a way, the sink information handling system (e.g., 300) may determine which video frame slices to which the user framing module 385, the super resolution module, 386 and zoom and face normalizer module 387 algorithms should be applied over a plurality of received video frames without repeatedly requiring a new HOP heat map associated with each frame, as it is received from the source information handling system.

In an embodiment, the HOP heat map may be used to facilitate the execution of other AV processing instruction modules. For example, a boundary detection AV processing instruction module may be executed by the video processing engine 380 of the source information handling system in order to detect a boundary between the remote participant's image in a video frame and a background behind the remote participant. Because the HOP heat map includes, among other data, data associated with the HOP video frame slice group that includes which video frame slices include a portion or the remote participant's body. As such, the video processing engine 380 of the source information handling system may limit or focus the application of the boundary detection processing instruction module to those video slices within the HOP video frame slice group. In another embodiment, the HOP heat map may be used to facilitate the execution of a face framing AV processing instruction module of the source information handling system by, again, limiting the number of slices or focusing the slices to which the application of the face framing AV processing instruction module is made by the video processing engine 380 to detect a face/head of a remote participant for framing within the videoframe. Similar advantages may be realized when the video processing engine 380 of the source information handling system executes any of a face detection AV processing instruction module, a gaze detection AV processing instruction module, among other AV processing instruction modules by assisting in locating the remote participant's image within the video frames. The execution of these other AV processing instruction modules at a source information handling system may further assist with other post-processing processes such as with the generation of a virtual background.

As described herein, the multimedia processing control API 325 may operate, at least in part, as a hub to facilitate communication between various hardware, firmware, and software applications operating at information handling system 300. As another example of this, the multimedia processing control API 325 may receive software performance metrics generated at a diagnostic analysis application, for example, describing applications available or running, number of videoconference participants, CPU usage or load, as well as a breakdown of the CPU usage attributable to each of a plurality of applications (e.g., including a MMCA) running via the operating system of the information handling system 300. The multimedia processing control API 325 may forward these software performance metrics to the AV processing instruction manager 341, in an embodiment, to determine if and when to offload execution of the user presence detection system to an alternative processor in the information handling system 300. Although the processes described in connection with the execution of the video frame user presence detection module 381, the user framing module 385, the super resolution module 386, or the zoom and face normalizer module 387 by the AV processing instruction manager 341 may reduce the consumption of processing resources at any given processing device, the AV processing instruction manager 341 may still offload these processes to other processors (e.g., GPU, VPU, GNA, CPUs) to allow the AV processing instruction manager 341 to conduct other processes.

FIG. 4 is a block diagram illustrating audio/visual (AV) processing instruction manager 441 for optimizing information handling system operation of a MMCA 440 according to an embodiment of the present disclosure. FIG. 4 shows an AV processing instruction manager 441 interacting with a streaming media driver 425 and MMCA 440 according to an embodiment of the present disclosure. As described herein throughout, the information handling system (e.g., 400) in various embodiments may operate as a source information handling system capturing video frames of a remote participant user and as a sink information handling system receiving such video frames for display via a digital display device. FIG. 4 further shows an example video frame 450 being presented to the streaming media driver 425 of a source information handling system (e.g., 400). Although FIG. 4 shows a single example video frame 450, the present specification contemplates that this video frame 450 is one of a plurality of video frames 450 received at and streamed by the streaming media driver 425 of the source information handling system.

The AV processing instruction manager 441 of a source information handling system (e.g., 400), as described herein, may cause one or more AV processing instruction modules to create, implement, and transmit data regarding a HOP heat map and delta HOP heat map. As described herein, the AV processing instruction manager 441 of a source information handling system (e.g., 400) may form part of a remote participant's information handling system. In another embodiment, the processes and hardware associated with the AV processing instruction manager 441 may be remote from the source information handling system (e.g., 400) in a distributed processing scenario allowing the information handling system to be a thin client device.

As described herein, the AV processing instruction manager 441 of a source information handling system (e.g., 400) may direct the application of a video frame user presence detection module 381 and any other number of AV processing instruction modules to each video frame 450 produced by the camera and passed to the AV processing instruction manager 441 during the video conference session. In the embodiment shown in FIG. 4, these AV processing instruction modules may be chained together to successively process the video frames 450 before those video frames 450 are sent to the MMCA 440 and presented to the users of sink information handling systems engaged in the video conference session. The AV processing instruction manager 441 of the information handling system 400 operating as a source information handling system, a sink information handling system, or both may include a device proxy 445. The device proxy 445 may be any device that, in an embodiment, uses resources other than a main central processing unit (CPU) such as a GPU, a VPU, GNA, among others. In an embodiment, the device proxy 445 may route or map connections between physical pins of the streaming media driver 425 (or other drivers) and the AV processing instruction manager 441.

With the device proxy 445, the AV processing instruction manager 441 may apply a number of AV processing instruction modules 443-1, 443-2, 443-n (e.g., AV processing instructions A, B, and C, respectively) including one or more of the video frame user presence detection module (FIG. 3, 381), the unusual motion detection processing instruction module (FIG. 3, 382), the encoding processing instruction module (FIG. 3, 383), the decoding processing instruction module (FIG. 3, 384), the user framing module (FIG. 3, 385), the super resolution module (FIG. 3, 386), and the zoom and face normalizer module (FIG. 3, 387). The AV processing instruction modules 443-1, 443-2, 443-n may include any sets of instructions defined by any number of the AV processing instruction modules used to manipulate the data associated with each of the video frames 450 as described herein. These AV processing instruction modules may include a video frame user presence detection module, an unusual motion detection processing instruction module, an encoding processing instruction module, and a decoding processing instruction module as described herein among others.

The information handling system 400 in an embodiment may include a plurality of processors, including, for example, a central processing unit (CPU) 402-1, a graphics processing unit (GPU) 402-2, a visual processing unit 402-3, and a gaussian neural accelerator (GNA) 402-4. The CPU 402-1 in an embodiment may execute the bulk of tasks relating to all software applications running via the operating system (OS), which may include the MMCA 440, the MFPIP incorporating the AV processing instruction manager 441, as well as several others. Increased processing load placed on the CPU 402-1 by the AV processing instruction manager 441 during execution of a user session for the MMCA 440 may decrease the processing resources left available for all other applications also running at the OS, which may include word processing applications (e.g., Microsoft® Word®), presentation applications (e.g., Microsoft® PowerPoint®), e-mail applications, web browsers, and other applications routinely used in conjunction with the multimedia multi-user collaboration application throughout a typical workday.

The GPU 402-2 in an embodiment may be a processor specialized for rapidly manipulating and altering memory to accelerate the creation of a video sample using a plurality of captures images stored in a frame buffer. GPU 402-2 may be more efficient at manipulating such stored video samples during image processing performed by one or more of the AV processing instruction modules (e.g., 443-1, 443-2, and 443-n) such as the video frame user presence detection module, the unusual motion detection processing instruction module, the encoding processing instruction module, the decoding processing instruction module, the user framing module, the super resolution module, and the zoom and face normalizer module in the embodiments described herein. The VPU 402-3 in an embodiment may be specialized for running machine vision algorithms such as convolutional neural networks (e.g., as used by color blending/matching AV processing instruction modules, luminance/brightness blending AV processing instruction modules, outline detection AV processing instruction modules, facial lighting correction AV processing instruction modules, and virtual background blur AV processing instruction, for example). The GNA 414 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the AV processing instruction modules 443-1, 443-2, or 443-n. The GNA 414 may operate in an embodiment to offload continuous inference workloads from the CPU 402-1, GPU 402-2, or VPU 402-3, including but not limited to noise reduction or speech recognition, to save power and free CPU 402-1 resources.

Each of the AV processing instruction modules (e.g., 443-1, 443-2, and 443-n) in an embodiment may be sets of algorithms or code instructions executed via the operating system (OS), using one of the processors of the information handling system 400 for modification of video data or audio data relating to streaming video conferencing applications. It is understood that any number of AV processing instruction modules is contemplated in discussing 443-1 through 443-n. A single processor may execute each of the AV processing instruction modules (e.g., 443-1, 443-2, and 443-n), a subgroup thereof, or may even execute a single AV processing instruction, according to various embodiments. The AV processing instruction manager 441 in an embodiment may determine which processor to access in order to execute each AV processing instruction modules (e.g., 443-1, 443-2, and 443-n) in an embodiment, based on offload instructions received at the AV processing instruction manager 441 in some embodiments. For example, in an embodiment in which the information handling system 400 acts as the source information handling system, the AV processing instruction manager 441 may access the VPU 402-3 or the GNA 402-4 to execute various video or audio processing algorithms supported by the features of the MMCA, as represented by AV processing instruction module A 443-1, pursuant to an offload instruction to avoid executing that AV processing instruction using the GPU 402-2 or CPU 402-1. As another example in such an embodiment, the AV processing instruction manager 441 may access the GPU 402-2 or CPU 402-1 to execute the audio or video compression algorithm represented by AV processing instruction module C 443-n. In yet another example in such an embodiment, the AV processing instruction manager 441 may access CPU 402-1 to multiplex the processed and encoded audio and video samples into a processed and encoded media sample.

In another example embodiment in which the information handling system 400 acts as the sink information handling system, to receive AV media samples captured at a remotely located source information handling system, the AV processing instruction manager 441 may offload execution of the audio or video decompression algorithm represented by AV processing instruction module C 443-n (e.g., decoding processing instruction module 384, FIG. 3) to the GPU 402-2. In another example of such an embodiment, the AV processing instruction manager 441 may offload execution of various video or audio processing algorithms supported by the features of the MMCA, as represented by AV processing instruction module B 443-2 to the GPU 402-2, GNA 402-4, or VPU 402-3. In such a way, the AV processing instruction manager 441 may retrieve audio and video samples from an external media source information handling system and perform one or more processing methods on the retrieved audio and video samples in accordance with offload instructions received at the AV processing instruction manager 441.

During operation, the streaming media driver 425 may be executed by a processor of the information handling system to distribute the video frames 450, in this embodiment, to the AV processing instruction manager 441. The AV processing instruction manager 441 may direct the execution and application of each of the AV processing instruction modules 443-1, 443-2, 443-n to each of the video frames 450. The AV processing instruction manager 441 may cause one or more of the AV processing instruction modules 443-1, 443-2, 443-n to be applied to the video frames 450 in series and may, in an embodiment, cause the reapplication of these AV processing instruction modules 443-1, 443-2, 443-n to each of the video frames 450. In an embodiment, any of the video frame user presence detection module, unusual motion detection processing instruction module, encoding processing instruction module, and decoding processing instruction module as the AV processing instruction modules 443-1, 443-2, 443-n may, when executed, require additional modification by a previously applied AV processing instruction modules 443-1, 443-2, 443-n in order to create the HOP heat map and delta HOP heat map.

By way of example, the AV processing instruction manager 441 of a source information handling system (e.g., 400) may cause a video frame user presence detection module to be executed. As described herein, the execution of the video frame user presence detection module causes a processor (401-1, 401-2, 401-3, 401-4) of a source information handling system (e.g., 400) to slice a video frame 450 into a plurality of video frame slices 452 and based on the distance data, create a human object presence (HOP) heat map and assign a probability of the presence of the remote participant's body within each video frame slice 452 of the video frame 450. The execution of the video frame user presence detection module may also cause the processor to select, among the plurality of video frame slices 452, those video frame slices 452 with an assigned probability of presence of the remote participant's body 456 that exceeds a threshold and create a HOP video frame slice group 454 where the remote participant's body 456 appears within the video frame 450 as described herein.

Because the video frame slices 452 have been bifurcated into two groups, the HOP video frame slice group 454 and any other slice not included in that group, the AV processing instruction manager 441 of a source information handling system (e.g., 400) may further execute an encoding processing instruction module that encodes these two groups of slices differently. For example, the execution of the encoding processing instruction module by the AV processing instruction manager 441 of a source information handling system (e.g., 400) causes the HOP video frame slice group 454 to be encoded by a first encoding algorithm. Additionally, execution of the encoding processing instruction module by the AV processing instruction manager 441 of a source information handling system (e.g., 400) causes those frame slices not part of the HOP video frame slice group 454 to be encoded using a second encoding algorithm having a lower computational burden than the first encoding algorithm. This creates encoding data that, when transmitted to a sink information handling system, allows for relatively quicker decoding of the video frame 450 due to less processing resources consumed. Similarly, because all video frames 450 are to be encoded prior to transmission to sink information handling systems, the encoding processes at the source information handling system (e.g., 400) consumes less processing resources due to the second encoding algorithm having a lower computational burden than the first encoding algorithm.

With the video frames 450 changed or augmented by these AV processing instruction modules 443-1, 443-2, 443-n at a source information handling system (e.g., 400), each video frame 450 may be transmitted to the MMCA 440 used to engage the user in a video conference session. The MMCA 440 of a source information handling system (e.g., 400) may then transmit these video frames 450 to a network 426 via, for example, a network interface device 420. The network 426 may include a server or other network device that allows other users of sink information handling systems engaged in the video conference session to view these frames. As described herein, the data associated with the HOP heat map and its HOP video frame slice group 454 as well as the data associated with the delta HOP heat map may be sent to the sink information handling systems before or concurrently with the video frames 450 being sent. This amount of data describing the HOP heat map and its HOP video frame slice group 454 have a relatively low bit rate. In an embodiment a new HOP heat map may not need to be coordinated in timing either with every video frame since successive video frames are unlikely to change too drastically from video frame to video frame. Thus, the HOP heat map may be used to update this data, via the OOB communication link for example, for every few video frames (e.g., every 2 to 3 frames), and that may be sufficient for decoding of the video frames at a sink information handling system.

In an embodiment, the data associated with the HOP heat map and its HOP video frame slice group 454 as well as the data associated with the delta HOP heat map may be sent using an OOB communication method over an OOB communication link. In an embodiment, the OOB communication link may be different from the communication link used by the source information handling system to send the video frames 450 to the sink information handling systems engaged in the video conferencing session.

The AV processing instruction manager 441 of a source information handling system (e.g., 400) may also cause an unusual motion detection processing instruction module 382 to be executed by a processor (401-1, 401-2, 401-3, 401-4) in one optional embodiment. The execution of the unusual motion detection processing instruction module causes the AV processing instruction manager 441 of a source information handling system (e.g., 400) to review, over a plurality of video frames 450, any changes to the position of the HOP video frame slice group 454. This creates, as described herein, a delta HOP heat map. The delta HOP heat map may, therefor, describe changes in position of the human image within the plurality of video frame slices 452 over a plurality of video frames captured by the video camera of a source information handling system (e.g., 400). In this embodiment, the HOP video frame slice group 454 may change location and size within any given video frame 450 presented at the MFPIP. This delta HOP heat map may describe these changes as the remote participant user of a source information handling system (e.g., 400), for example, moves left, right, forward, or backwards during the video conferencing session. The delta HOP heat map for subsequent video frames may be transmitted or used after an initial HOP heat map and HOP slice group has been transmitted for a first video frame. The delta HOP heat map is used to further reduce data transmitted to a sink information handling system. In an embodiment, the OOB communication described herein may send the data defining the HOP heat map and the HOP video frame slice group or the delta HOP heat map.

As described herein, the AV processing instruction manager 441 may be a processor that, in an embodiment, offloads the processing to other types of processing devices such as a GPU, GNA, dedicated CPU, VPU, among others. In an embodiment, the processor may be used during this offload processes used to apply the AV processing instruction modules 443-1, 443-2, 443-n to these devices so that the processor may execute other process such as a word processing application, a visual presentation program or the like in order to better engage with the other remote participants engaged in the video conference session.

As described herein, the information handling system 400 may also operate as a sink information handling system in an embodiment. In such an embodiment, the sink information handling system (e.g., 400) may receive encoded video or audio frames of a remote participant user of a source information handling system. In an embodiment, these encoded video or audio frames may have been encoded at the source information handling system based on HOP heat maps also generated at the source information handling system and described directly above. In such an embodiment, the sink information handling system (e.g., 400) may also receive a plurality of HOP heat maps, or delta HOP heat map data generated at the source information handling system, with each HOP heat map corresponding to a video frame received at the sink information handling system (e.g., 400). In such an embodiment, for example, the example video frame 450 may be received at the sink information handling system (e.g., 400) in an encoded format from the source information handling system via network 426 and network interface device 420. The HOP heat map data, delta HOP heat map data, or HOP video frame slice group identifications described herein may also be received at the sink information handling system (e.g., 400) via network 426 and network interface device 420. In some embodiments, the HOP heat map data, delta HOP heat map data, or HOP video frame slice group identifications may be received via OOB communications on a link separate from the link in which the sink information handling system 400 receives the video frames including example video frame 450. The AV processing instruction manager 441 of such a sink information handling system (e.g., 400) in an embodiment may receive encoded versions of these video frames 450, the HOP heat map data, the delta HOP heat map data, or the HOP video frame slice group identifications via the MMCA 440.

The AV processing instruction manager 441 of the sink information handling system (e.g., 400) may further direct execution of various AV processing instruction modules (e.g., 443-1, 443-2, and 443-n). For example, the sink information handling system (e.g., 400) may receive data identifying the video frame slices falling within the HOP video frame slice group and video frame slices falling outside the HOP video frame slice group, and may direct execution of a decoding processing instruction module (FIG. 3, 384) at 443-n. The decoding process instruction module occurring at 443-n in such an embodiment may operate to identify a first decoding algorithm corresponding to the first encoding algorithm used by the source information handling system, and identify a second decoding algorithm corresponding to the second encoding algorithm used by the source information handling system. The AV processing instruction manager 441 of the sink information handling system (e.g., 400) may decode the video frame slices falling within the HOP video frame slice group using the first decoding algorithm and decode the video frame slices falling outside the HOP video frame slice group using the second decoding algorithm. The first of these decoding algorithms in an embodiment may require less computational resources for execution than the second of these decoding algorithms, resulting in conservation of computational resources for execution of concurrently executing applications, other than the MMCA at the sink information handling system (e.g., 400).

The sink information handling system (e.g., 400) in an embodiment may execute further video or audio processing instruction modules. For example, the AV processing instruction manager 441 in an embodiment may direction execution at 443-2 of a video frame user presence detection processing instruction module (FIG. 3, 381) to identify video frame slices falling within the HOP video frame slice group indicating presence of the remote participant's body based on the received HOP heat map data associated with a video frame. As another example, the AV processing instruction manager 441 in an embodiment may direction execution at 443-2 of a unusual motion detection processing instruction module 382 to determine whether a delta HOP heat map associated with a received video frame indicates movement of the remote participant within the video frame.

As described herein, sink information handling system (e.g., 400) may apply one or more further AV processing instruction modules (e.g., FIG. 3 user framing module 385, super resolution module 386, or zoom and face normalizer module 387) based on the assignment of slices of a first received video frame to the HOP video frame slice group indicated to contain images of the remote participant's body, as defined within the HOP heat map data associated with this first received video frame. In order to avoid repeating this step for each video frame received from the source information handling system, the sink information handling system (e.g., 300) may refer to the delta HOP heat map data associated with each frame. If the delta HOP heat map data associated with a frame does not indicate movement of the remote participant between the last received frame and the current frame, this may indicate the HOP heat map data identifying which slices of the last received frame fall within the HOP video frame slice group may be used to determine which slices of the current frame fall within the HOP video frame slice group. If the delta HOP heat map data does indicate a difference, then the previous frame HOP heat map may be amended to have a new subset of frame slices forming the HOP video frame slice group. In such a way, the sink information handling system (e.g., 400) may determine which video frame slices to which further AV processing instruction modules should be applied over a plurality of received video frames without repeatedly requiring a new HOP heat map associated with each frame, as it is received from the source information handling system.

The sink information handling system (e.g., 400) in an embodiment may execute still further video or audio processing instruction modules. For example, the AV processing instruction manager 441 in an embodiment may direct execution at 443-1 of a user framing module (FIG. 3, 385), a super resolution module (FIG. 3, 386), or a zoom and face normalizer module (FIG. 3, 387). The user framing module (FIG. 3, 385) in an embodiment may operate to identify a user's face and center the user's face within each captured image making up the video sample. In an embodiment, the super resolution module (FIG. 3, 386) may recover a high-resolution image from a low-resolution image, using a known degradation function. The zoom and face normalizer module (FIG. 3, 387) of the sink information handling system (e.g., 300) in an embodiment may operate to crop, enlarge, or scale down various video frames of the remote participant user of the source information handling system to normalize the size of the remote participant's face across each of the video frames received from the source information handling system.

The AV processing instruction manager 441 in various embodiments may decrease the processing resources consumed during execution of one or more of these AV processing instruction modules described directly above based on identification of the HOP video frame slice group in which a remote participant appears. For example, the AV processing instruction manager 441 executing the user framing module (FIG. 3, 385) in an embodiment may limit processing resources consumed during execution of the algorithm for framing the user's face within each video frame by placing the HOP video frame slice group in which user presence has been detected within the center of the video frame, negating the need to identify the user's face through face recognition algorithms across the videoframe. As another example, the AV processing instruction manager 441 executing the super resolution module (FIG. 3, 386) in an embodiment may limit execution of the super resolution module algorithm to the portion of each video frame in which the remote participant appears, as these portions may be considered to be the most important. In still another example, the AV processing instruction manager 441 executing the zoom and face normalizer module (FIG. 3, 387) in an embodiment may use the HOP heat map data, delta HOP heat map data, or HOP video frame slice group identifications to identify the HOP video frame slice group in which the remote participant is present, and to crop, enlarge, or scale down various video frames such that the portion of each of these video frames in which the remote participant appears (as determined based on the HOP heat map or delta HOP heat map) remains consistent across all video frames.

FIG. 5 is a block diagram illustrating an information handling system 500 according to another embodiment of the present disclosure. FIG. 5 shows the interactions between the different hardware, software, and firmware components of the information handling system 500 relative to an information handling system performance optimizer application 575. As described herein, in various embodiments, the information handling system 500 may operate as a source information handling system capturing video frames of a remote participant user of the source information handling system, as a sink information handling system receiving these captured video frames for display via a digital display device.

In an embodiment, the information handling system performance optimizer application 575 may be an application executed remote from the information handling system 500 such that the remote participant may relay data associated with the HOP heat map and its HOP video frame slice group over, for example, a network. In an embodiment, the information handling system performance optimizer application 575 may form part of a multimedia multi-user collaboration application (MMCA) not native to the information handling system 500. In this embodiment, the MMCA may be a web-based application that provides the services described herein to multiple users over a network. The information handling system performance optimizer application 575 may receive any of the data associated with the HOP heat map and its HOP video frame slice group as well as any data associated with a delta HOP heat map from any of the source information handling systems engaged in the video conferencing session and relay that data to an appropriate sink information handling system.

In an embodiment, the information handling system performance optimizer application 575 may operate to manage security credentials, connectivity credentials, performance optimization, software updates, and other various routine computing maintenance tasks for a plurality of information handling systems (e.g., including 500) owned by an enterprise business or produced by a single manufacturer. The Dell® Optimizer® software application is one example of such an information handling system performance optimizer application 575. The information handling system performance optimizer application 575 in such an embodiment may communicate with the embedded controller 504 to receive high-level hardware performance metrics from each of the plurality of information handling systems (e.g., including 500) it manages during routine out-of-band communications between the information handling system performance optimizer application 575 and all managed information handling systems (e.g., 500). Such out-of-band (OOB) communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application 575 may accumulate, sort, and analyze all performance metrics received from all managed information handling systems (e.g., 500). OOB communications initiated in such a way between the embedded controller 504 and the information handling system performance optimizer application 575 may be via a wireless network such as Wi-Fi or cellular, or via wired connection. Such OOB communications operate without need for operating system (OS) intervention or function and may operate behind the scenes to ensure optimized function for managed information handling systems (e.g., 500). In a specific embodiment, the OOB communications executed by the embedded controller 504 may relay that data associated with the HOP heat map and its HOP video frame slice group as well as, in an embodiment, data associated with the delta HOP heat map to other sink information handling systems to facilitate the decoding of a video frame as described herein.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the multimedia multi-user collaboration application 550 to display videos of other participants within a shared user session of a video conferencing system. A source information handling system (e.g., 500) in an embodiment may capture audio samples and video frame images of the remote participant user of the source information handling system (e.g., 500) via a camera and microphone, for example. The audio driver 529 may be in communication with the AV processing instruction manager such that audio samples received by the audio driver 529 from such a microphone may be transmitted to an AV processing instruction manager 541 (e.g., via the audio processing engine, or via the streaming media driver, for example) in an embodiment.

As described herein, the streaming media driver 527 in such an embodiment may receive video or audio samples captured by peripheral cameras or microphones in communication therewith, according to default or optimized media capture instructions. In another embodiment, the audio driver 529 may receive audio samples captured by the microphone, for example, in communication therewith, according to such received media capture instructions. In such an embodiment, the audio driver 529 may operate as a mini-driver or child device to the parent device streaming media driver 527. The streaming media device driver 527 may be in communication with an AV processing instruction manager 541 via one or more ports (e.g., as described in greater detail with respect to the device proxy 445 of FIG. 4) such that video or audio samples of the remote participant user of the source information handling system (e.g., 500) received by the streaming media device driver 527 may be transmitted to an AV processing instruction manager 541, in an embodiment. The audio driver 529 may be in communication with the AV processing instruction manager such that audio samples received by the audio driver 529 may be transmitted to the AV processing instruction manager 541 (e.g., via the audio processing engine 590, or via the streaming media driver 527, for example) in an embodiment. In such a way, the AV processing instruction manager 541 may direct retrieval of a video sample captured at a camera operably connected to a source information handling system (e.g., 500) and retrieval of an audio sample captured at a microphone operably connected to a source information handling system (e.g., 500).

In an embodiment, the source information handling system (e.g., 500) may include various sensors, such as a TOF sensor 548. The TOF sensor 548 may be used to provide distance data descriptive of the distance between a remote participant's body, or any background object, and the video camera of the information handling system. This TOF sensor 548 may help inform, as input, as to how to distinguish between a human object and a non-human object in the video frames. As described herein, the TOF sensor 548, along with the camera of the source information handling system (e.g., 500), may be used to provide data to the processor in order to define the HOP heat map via the video frame UPD processing module 581 or delta HOP heat map via the UMD processing instruction module 582. The TOF sensor 548 may include a sensor driver 531 used by the hardware to interface the hardware with the operating system of the source information handling system (e.g., 500). During these operations, a number of drivers associated with the streaming media driver 527 may be executed by the processor to enable an OS of the source information handling system (e.g., 500) and other computer programs to access hardware functions of the input/output devices, sensors, and the video camera, among others.

The MFPIP 538 in an embodiment in which the information handling system 500 is operating as a source information handling system may include audio or video processing systems of the information handling system 500 that, per the execution of the video processing engine 580, applies any number of AV processing instruction modules to each of the video frames created as the video camera (e.g., webcam) of the source information handling system (e.g., 500) provides those video frames to the video conference session executed by the MMCA 540. In an embodiment, the MFPIP 538 of such a source information handling system (e.g., 500) receives a stream of video frames and executes a number of AV processing instruction modules including a video frame user presence detection processing instruction module 581, an unusual motion detection AV processing instruction module 582, as well as the encoding processing instruction module 583, as described herein. The video processing engine 580 may direct the application of the AV processing instruction modules described herein to each video frame produced by the camera of the source information handling system (e.g., 500) and passed to the video processing engine 580 during the video conference session. In the embodiment shown in FIG. 4, these AV processing instruction modules may be chained together that successively processes the video frames before those video frames are sent to a sink information handling system.

Execution of the video frame user presence detection processing instruction module 581 at the source information handling system (e.g., 500) may generate the HOP heat map and HOP video frame slice group according to the embodiments described herein and in coordination with a distance sensor. The execution of the unusual processing instruction module 582 may generate the optional delta HOP heat map based on detected movement of the remote participant by a distance sensor (e.g., TOF sensor 548) according to the embodiments described herein.

The multimedia processing control API 542 in an embodiment may operate, at least in part, as a hub, facilitating communication of each of the data associated with the HOP heat map and its HOP video frame slice group as well as the delta HOP heat map, media capture instructions, and various sensor readings to the IHSPO 575, or agent 571 thereof. For example, processed video frames, one or more HOP heat maps and associated data, one or more delta HOP heat maps and associated data, or HOP video frame slice group information generated by the MFPIP 538 and the AV processing instruction manager 541 may be directed by the IHSPO 575 to be sent over a dedicated OOB communication link in order to facilitate any sink information handling system in the decoding processes conducted via the execution of a decoding processing instruction module by an AV processing instruction manager of a sink information handling system as described herein.

In other embodiments, the IHSPO 575 may be in direct communication with the embedded controller 504 via these out-of-band communications. In such embodiments, the data associated with the HOP heat map and its HOP video frame slice group as well as the delta HOP heat map may be acquired from the AV processing instruction manager 541 by the embedded controller 504 in kernel mode and communicated to the IHSPO 575 directly during routine out-of-band communications between the IHSPO 575 and all managed information handling systems (e.g., including 500). Such out-of-band communications with the embedded controller 504 in an embodiment may be used to facilitate the transmission of the data associated with the HOP heat map and its HOP video frame slice group as well as the delta HOP heat map. Out-of-band communications initiated in such a way between the embedded controller 504 and the IHSPO 575 may be via a wireless network such as Wi-Fi or cellular, or via wired connection.

As described herein, in various embodiments, the information handling system 500 may operate as a source information handling system capturing video frames of a remote participant user of the source information handling system, as a sink information handling system receiving these captured video frames for display via a digital display device. In an embodiment in which the information handling system 500 is operating as a sink information handling system, the multimedia processing control API 542 may operate, at least in part, as a hub, to receive each of the data associated with the HOP heat map and its HOP video frame slice group as well as any delta HOP heat map data, from the IHSPO 575, or agent 571 thereof. For example, processed video frames, one or more HOP heat maps and associated data, one or more delta HOP heat maps and associated data, or HOP video frame slice group information generated by the source information handling system and transmitted to the IHSPO 575 may be sent by the IHSPO 575 to the sink information handling system (e.g., 500) over a dedicated OOB communication link. In other embodiments, processed video frames, one or more HOP heat maps and associated data, one or more delta HOP heat maps and associated data, or HOP video frame slice group information may be transmitted to the IHSPO 575 to the sink information handling system (e.g., 500) over the same wireless link in which the underlying video frames are transmitted.

In other embodiments, the IHSPO 575 may be in direct communication with the embedded controller 504 of such a sink information handling system (e.g., 500) via these out-of-band communications. In such embodiments, the data associated with the HOP heat map and its HOP video frame slice group as well as the delta HOP heat map may be acquired from the IHSPO 575 by the embedded controller 504 in kernel mode and communicated to the multimedia processing control API 542 directly during routine out-of-band communications between the IHSPO 575 and all managed information handling systems (e.g., including 500). Such out-of-band communications with the embedded controller 504 in an embodiment may be used to facilitate the transmission of the data associated with the HOP heat map and its HOP video frame slice group as well as the delta HOP heat map. Out-of-band communications initiated in such a way between the embedded controller 504 and the IHSPO 575 may be via a wireless network such as Wi-Fi or cellular, or via wired connection.

In order to properly decode any encoded video frames received at such a sink information handling system (e.g., 500), the sink information handling system (e.g., 500) may receive assignments of video frame slices to HOP video frame slice groups created by the source information handling system. The sink information handling system (e.g., 500) in an embodiment may identify a first decoding algorithm corresponding to the first encoding algorithm used by the source information handling system, and identify a second decoding algorithm corresponding to the second encoding algorithm used by the source information handling system. In such an embodiment, the decoding processing instruction module 584 of the sink information handling system (e.g., 500) may decode the video frame slices falling within the HOP video frame slice group using the first decoding algorithm and decode the video frame slices falling outside the HOP video frame slice group using the second decoding algorithm. The first of these decoding algorithms in an embodiment may require less computational resources for execution than the second of these decoding algorithms, resulting in conservation of computational resources for execution of concurrently executing applications, other than the MMCA 540 at the sink information handling system (e.g., 500).

For each decoded video frame, the video frame user presence detection processing instruction module 581 of the sink information handling system (e.g., 500) in an embodiment may use the HOP heat map to determine which of the video frame slices fall within the HOP video frame slice group, and which video frame slices fall outside the HOP video frame slice group. In some embodiments, the sink information handling system (e.g., 500) may also receive a delta HOP heat map generated at the source information handling system indicating when the remote participant has shifted positions within the encoded video frames. The unusual motion detection processing instruction module 582 of the sink information handling system (e.g., 500) in such an embodiment may use the delta HOP heat map to determine when assignment of various video frame slices has occurred, rather than processing each HOP heat map to determine which video slices of each video frame fall within the HOP video frame slice group and which video frame slices fall outside the HOP video frame slice group using the HOP heat map. Thus, in an embodiment, the sink information handling system (e.g., 500) may set the assignments of the HOP video frame slice group for the newly received video frame as the current or default HOP video frame slice group assignment. By only updating these assignments of certain video frame slices as falling within or outside the HOP video frame slice group when a change in the user's position has been detected, the sink information handling system (e.g., 500) may further decrease processing power associated with repeatedly determining which video frame slices fall within or outside the HOP video frame slice group for each received video frame.

The AV processing instruction manager 541 in an embodiment in which the information handling system 500 is a sink information handling system may further direct the video processing engine 580 to execute a user framing module 585, a super resolution module 586, or a zoom and face normalizer module 587. The user framing module 585 in an embodiment may operate to identify a user's face and center the user's face within each captured image making up the video sample. In an embodiment, the super resolution module 586 may recover a high-resolution image from a low-resolution image, using a known degradation function. The zoom and face normalizer module 587 of the sink information handling system (e.g., 500) in an embodiment may operate to crop, enlarge, or scale down various video frames of the remote participant user of the source information handling system to normalize the size of the remote participant's face across each of the video frames received from the source information handling system.

The AV processing instruction manager 541 in various embodiments may decrease the processing resources consumed during execution of one or more of these AV processing instruction modules described directly above based on identification of the HOP video frame slice group in which a remote participant appears, as determined by the UMD processing instruction module 582, the video frame UPD processing instruction module 581, or both, or through receipt of such an identification directly from the source information handling system via the IHSPO 575. For example, the AV processing instruction manager 541 executing the user framing module 585 in an embodiment may limit processing resources consumed during execution of the algorithm for framing the user's face within each video frame by placing the HOP video frame slice group in which user presence has been detected within the center of the video frame, negating the need to identify the user's face through face recognition algorithms. As another example, the AV processing instruction manager 541 executing the super resolution module 586 in an embodiment may limit execution of the super resolution module algorithm to the portion of each video frame in which the remote participant appears, as these portions may be considered to be the most important. In still another example, the AV processing instruction manager 541 executing the zoom and face normalizer module 587 in an embodiment may use the HOP heat map data, delta HOP heat map data, or HOP video frame slice group identifications to identify the HOP video frame slice group in which the remote participant is present, and to crop, enlarge, or scale down various video frames such that the portion of each of these video frames in which the remote participant appears (as determined based on the HOP heat map or delta HOP heat map) remains consistent across all video frames.

Upon execution of all processing instruction modules (e.g., 581, 582, 583, 584, 585, 586, or 587) at the sink information handling system (e.g., 500) in an embodiment, the AV processing instruction manager 541 may transmit the decoded and fully processed video frames or audio samples to various output devices. A number of drivers associated with the streaming media driver 527 may be executed by the processor to enable an OS of the sink information handling system (e.g., 500) and other computer programs to access hardware functions of the input/output devices, sensors, speakers and digital display device, among others. For example, the AV processing instruction manager 541 may transmit the decoded and fully processed video frames and audio samples to the streaming media driver 527 of a sink information handling system (e.g., 500). In such an example embodiment, the AV processing instruction manager 541 may forward instructions for playback of the decoded video frames of the remote participant user of the source information handling system to a digital display device (e.g., 220 of FIG. 2) of the sink information handling system (e.g., 500). The AV processing instruction manager 541 in such an embodiment may also forward instructions for playback of the decoded audio samples of the remote participant user of the source information handling system at a speaker (e.g., 221 of FIG. 2). In other embodiments, the AV processing instruction manager 541 may forward instructions for playback of the decoded audio samples to the speaker (e.g., 221 of FIG. 2) via the audio driver 529.

As described, IHSPO 575, in an embodiment, may operate remotely from the information handling system 500 in an embodiment. For example, the IHSPO 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

In an embodiment, software performance metrics may be generated at a diagnostic analysis application 523, based at least in part on communication between the diagnostic analysis application 523 and the processor of the information handling system 500. Such a diagnostic analysis application 523 may operate to gather metrics describing CPU usage or load, as well as a breakdown of the CPU usage attributable to each of a plurality of applications (e.g., including a multimedia multi-user collaboration application 540) running via the operating system of the information handling system 500. In some embodiments, the diagnostic analysis application 523 may provide similar metrics for other types of processors for the information handling system, including, for example, a graphics processing unit (GPU), visual processing unit (VPU), or gaussian neural accelerator (GNA). One example of such a diagnostic analysis application 523 in an embodiment may include the Microsoft® Diagnostic Data Viewer® software application. In an embodiment, these software performance metrics may be generated at the diagnostic analysis application 523 and transmitted to the AV processing instruction manager via the multimedia processing controller API 542.

The information handling system 500 in FIG. 5 shows an MMCA 540 that is executable by a processor of the information handling system 500 in an embodiment. In an embodiment, the MMCA may be executed by the IHSPO 575 as a web-based application for a plurality of information handling systems.

Similar to above, the information handling system 500 may be powered on via use of an on switch and a PMU. The PMU may power on an embedded controller 504 and any processors that, in an embodiment, execute a basic input/output system (BIOS) and, in an embodiment, an operating system (OS).

In an embodiment, during operation of the information handling system 500, a trained neural network may be used to receive a number of inputs in the form of AV processing instruction modules that have been enabled as well as sensor data. The data associated with these selections and sensor data is used as input to a trained neural network to provide, as output, optimized output settings that adjusts any AV processing instruction modules such as the video frame user presence detection module 581, the unusual motion detection processing instruction module 582, the encoding processing instruction module 583, the decoding processing instruction module 584, the user framing module 585, the super resolution module 586, or the zoom and face normalizer module 587 as well as any other AV processing instruction module that for example, corrects any visual component of the video frame such as the background lighting, color blending/matching, luminance/brightness blending, outline detection, facial lighting correction, and virtual background blur within each video frame. Each of these AV processing instruction modules, when executed by the processor, adjusts those video frames as described herein.

Figure 6:
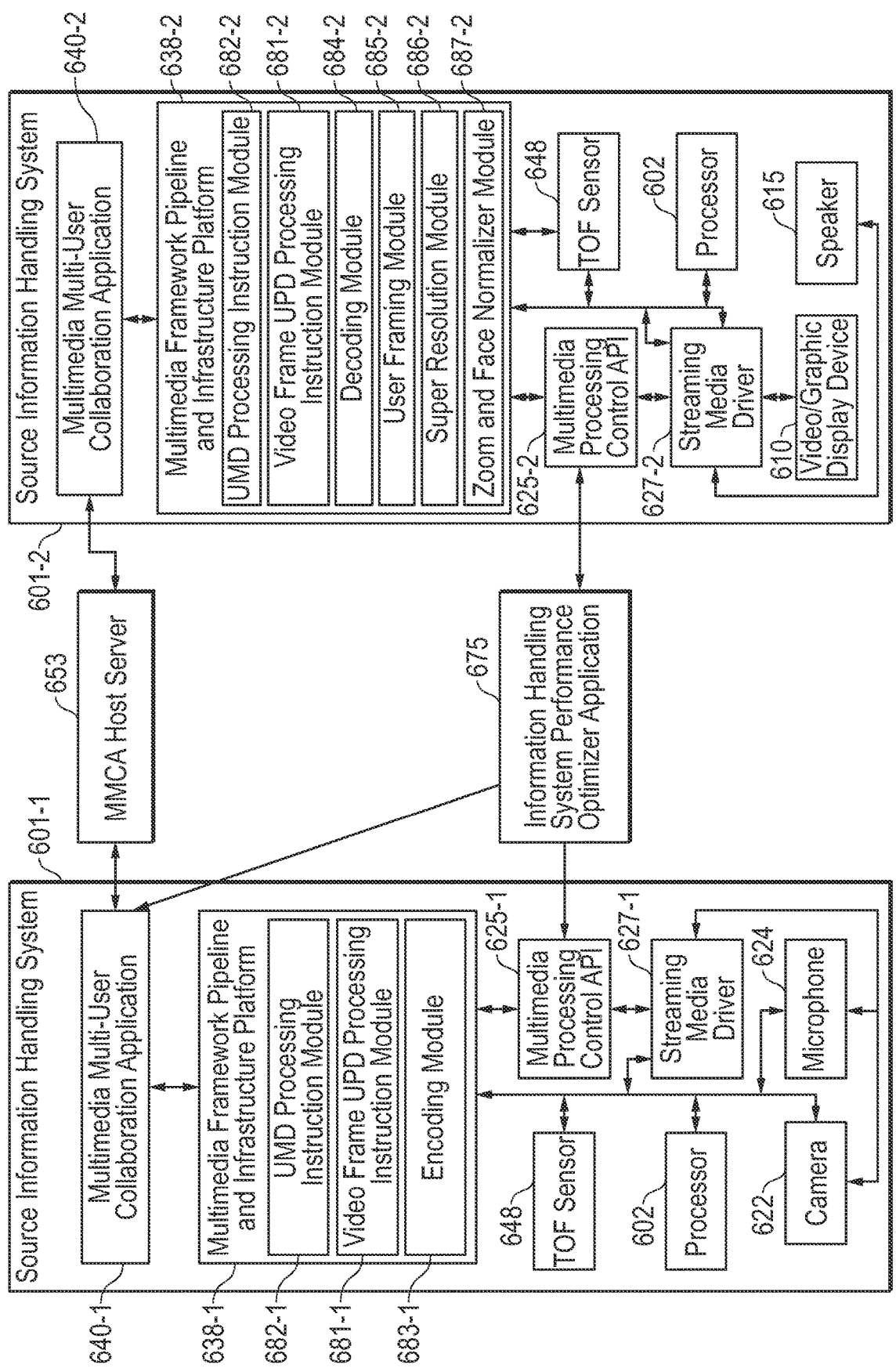
FIG. 6 is a block diagram illustrating an embodiment of a system for optimizing execution of an MMCA according to an embodiment of the present disclosure.

FIG. 6 is a block diagram illustrating another embodiment of a system for optimizing information handling system operation of an MMCA according to an embodiment of the present disclosure. User sessions may be hosted and coordinated by a multimedia multi-user collaboration application host server 653 located remotely from, but in communication with one or more source information handling systems (e.g., 601-1) and one or more sink information handling systems (e.g., 601-2) via a network.

In an embodiment, the operations and processes conducted by the source information handling system 601-1 may be similar to those of the sink information handling system 601-1. Because the source information handling system 601-1 and sink information handling system 601-1 are engaged in the execution of an MMCA 640-1, 640-2 and participating in a video conference session, each of the source information handling system 601-1 and sink information handling system 601-2 are sending and receiving video frames among each other so that the remote participant user of the source information handling system 601-1 and the user of the sink information handling system 601-2 can view and hear, in real-time, the image and sounds produced by the other user or participant. Therefore, the present specifications contemplate that the source information handling system 601-1 and sink information handling system 601-2 may perform concurrently those processes of the other at any given time.

As described herein, the source information handling system 601-1 and sink information handling system 601-2 each include a MMCA 640-1, 640-2. The MMCA 640-1, 640-2 may be any application that, when executed by the processor 602-1, 602-2, initiate a video conference session between a plurality of users such as between the remote participant user of the source information handling system 601-1 and the user of the sink information handling system 601-2. With the MMCA 640-1, 640-2 and per the user selections, the MMCA 640-1, 640-2 may present each video frame to the user at a respective video/graphic display device (e.g., 610). In an example embodiment, the MMCA 640-1 of the source information handling system 601-1 may transmit processed and encoded video frames of a remote participant user of the source information handling system 601-1, as captured via the camera 622 and microphone 624 and processed by the MFPIP 638-1 to the MMCA 640-2 via the MMCA host server 653. The MMCA 640-1 of the source information handling system 601-1 may also transmit, in various embodiments described herein, HOP heat map data, delta HOP heat map data, or HOP video frame slice group identifications generated by various processing instruction modules of the MFPIP 638-1 to the MMCA 640-2 via the MMCA host server 653, or via the IHSPO 675 in OOB communications.

In an embodiment, the MMCA host server 653 may operatively couple the source information handling system 601-1 and sink information handling system 601-2 to facilitate the operation of the video conference session. The MMCA host server 653 may also provide certain services such as video conferencing session recording storage as well as manage secure access to access the video conferencing session, scheduling, and network linking of participants. Examples of a MMCA 640-1, 640-2 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The MFPIPs 638-1, 638-2 may include audio or video processing system of the source information handling system 601-1 or sink information handling system 601-2 that applies any number of AV processing instruction modules the each of the video frames created as the video camera (e.g., webcam) (e.g., 622) provides those video frames to the video conference session executed by the MMCA 640-1, 640-2. In an embodiment, the MFPIPs 638-1, and 638-2 may receive a stream of video frames (either captured from the camera 622 or received at the MMCA 640-2). Via application of these AV processing instruction modules such as the video frame user presence detection (UPD) processing instruction module 681-1, or unusual movement detection (UMD) processing instruction module 682-1, the source information handling system 601-1 may create the HOP heat map, HOP video frame slice group, or optionally delta HOP heat maps according to several embodiments as described herein.

Various processing instruction modules of the MFPIP 638-2 of the sink information handling system 601-2 may use the HOP heat map, HOP video frame slice group, or optionally delta HOP heat maps generated at the source information handling system 601-1 and transmitted to the sink information handling system 601-2, as described herein. For example, in order to properly decode any encoded video frames received at such a sink information handling system 601-2, the sink information handling system 601-2 may receive assignments of video frame slices to HOP video frame slice groups created by the source information handling system 601-1. The sink information handling system 601-2 in an embodiment may identify a first decoding algorithm corresponding to the first encoding algorithm used by the source information handling system, and identify a second decoding algorithm corresponding to the second encoding algorithm used by the source information handling system. In such an embodiment, the decoding processing instruction module 683-2 of the sink information handling system 601-2 may decode the video frame slices falling within the HOP video frame slice group using the first decoding algorithm and decode the video frame slices falling outside the HOP video frame slice group using the second decoding algorithm. The first of these decoding algorithms in an embodiment may require less computational resources for execution than the second of these decoding algorithms, resulting in conservation of computational resources for execution of concurrently executing applications, other than the MMCA 640-2 at the sink information handling system 601-2.

For each decoded video frame, the video frame user presence detection processing instruction module 682-2 of the sink information handling system 601-2 in an embodiment may use the HOP heat map to determine which of the video frame slices fall within the HOP video frame slice group, and which video frame slices fall outside the HOP video frame slice group. In some embodiments, the sink information handling system 601-2 may also receive a delta HOP heat map generated at the source information handling system 601-1 indicating when the remote participant has shifted positions within the encoded video frames. The unusual motion detection processing instruction module 682-2 of the sink information handling system 601-2 in such an embodiment may use the delta HOP heat map to determine when adjustment to assignment of various video frame slices has occurred, rather than processing each HOP heat map to determine which video slices of each video frame fall within the HOP video frame slice group and which video frame slices fall outside the HOP video frame slice group using the HOP heat map. Thus, in an embodiment, the sink information handling system 601-2 may set the assignments of the HOP video frame slice group for the newly received video frame as the current or default HOP video frame slice group assignment. By only updating these assignments of certain video frame slices as falling within or outside the HOP video frame slice group when a change in the user's position has been detected, the sink information handling system 601-2 may further decrease processing power associated with repeatedly determining which video frame slices fall within or outside the HOP video frame slice group for each received video frame.

The AV processing instruction manager of the sink information handling system 601-2 MFPIP 638-2 in an embodiment may further direct execution of a user framing module 685-2, a super resolution module 686-2, or a zoom and face normalizer module 687-2. The user framing module 685-2 in an embodiment may operate to identify a user's face and center the user's face within each captured image making up the video sample. In an embodiment, the super resolution module 686-2 may recover a high-resolution image from a low-resolution image, using a known degradation function. The zoom and face normalizer module 687-2 of the sink information handling system 601-2 in an embodiment may operate to crop, enlarge, or scale down various video frames of the remote participant user of the source information handling system 601-1 to normalize the size of the remote participant's face across each of the video frames received from the source information handling system 601-1.

The AV processing instruction manager of the sink information handling system 601-2 MFPIP 638-2 in various embodiments may decrease the processing resources consumed during execution of one or more of these AV processing instruction modules described directly above based on identification of the HOP video frame slice group in which a remote participant appears, as determined by the UMD processing instruction module (e.g., 682-1, or 682-2), the video frame UPD processing instruction module (e.g., 681-1, or 681-2), or both. For example, the MFPIP 638-2 executing the user framing module 685-2 in an embodiment may limit processing resources consumed during execution of the algorithm for framing the user's face within each video frame by placing the HOP video frame slice group in which user presence has been detected within the center of the video frame, negating the need to identify the user's face through face recognition algorithms. As another example, the MFPIP 638-2 executing the super resolution module 686-2 in an embodiment may limit execution of the super resolution module algorithm to the portion of each video frame in which the remote participant appears, as these portions may be considered to be the most important. In still another example, the MFPIP 638-2 executing the zoom and face normalizer module 687-2 in an embodiment may use the HOP heat map data, delta HOP heat map data, or HOP video frame slice group identifications to identify the HOP video frame slice group in which the remote participant is present, and to crop, enlarge, or scale down various video frames such that the portion of each of these video frames in which the remote participant appears (as determined based on the HOP heat map or delta HOP heat map) remains consistent across all video frames.

Each of the source information handling system 601-1 and sink information handling system 601-2 may include a streaming media driver 627-1, 627-2. As described herein, the streaming media driver 627-1 of the source information handling system 601-1 in an embodiment may receive video or audio samples captured by peripheral cameras (e.g., 622) or microphones (e.g., 624) in communication therewith, according to default or optimized media capture instructions. In another embodiment, the audio driver may receive audio samples captured by the microphone (e.g., 624), for example, in communication therewith, according to such received media capture instructions. In such an embodiment, the audio driver may operate as a mini-driver or child device to the parent device streaming media device driver 627-1, or 627-2. The streaming media device driver 627-1 may be in communication with an AV processing instruction manager of the MFPIP 638-1 via one or more ports (e.g., as described in greater detail with respect to the device proxy 445 of FIG. 4) such that video or audio samples received by the streaming media device driver 627-1 may be transmitted to an AV processing instruction manager of the MFPIP 638-1, in an embodiment. The audio driver may be in communication with the AV processing instruction manager of the MFPIP 638-1 such that audio samples received by the audio driver may be transmitted to the AV processing instruction manager (e.g., via the audio processing engine, or via the streaming media driver, for example) in an embodiment. In such a way, the AV processing instruction manager of the MFPIP 638-1 may direct retrieval of a video sample captured at a camera (e.g., 622) operably connected to the source information handling system 601-1 and retrieval of an audio sample captured at a microphone (e.g., 624) operably connected to the source information handling system 601-1.

As also described herein, the streaming media driver 627-2 of the sink information handling system 601-2 in an embodiment may receive video frames and audio samples of the remote participant user of the source information handling system 601-1, as decoded and processed by the MFPIP 638-2 for playback at the sink information handling system 601-2. The streaming media device driver 627-2 may be in communication with an AV processing instruction manager of the MFPIP 638-2 via one or more ports (e.g., as described in greater detail with respect to the device proxy 445 of FIG. 4) such that video or audio samples received processed by the AV processing instruction manager of the MFPIP 638-1 in an embodiment may be transmitted to the streaming media device driver 627-2.

The source information handling system 601-1 and sink information handling system 601-2 may further include a MPCAPI 625-1, 625-2. The MPCAPI 625-1, 625-2 in an embodiment may operate to facilitate communication between various applications, controllers, and drivers of the information handling system in an embodiment. For example, the MPCAPI 625-1, 625-2 may interface between a MFPIP 638-1, 638-2 and the sensors of the sensor array such as the video camera (e.g., 622), the TOF sensors 648, among others.

In an embodiment, the source information handling system 601-1, as well as the sink information handling system 601-2, may include a microphone 624 used to receive sounds from the remote participant user. The source information handling system 601-1, as well as the sink information handling system 601-2 in an embodiment may also include a speaker (e.g., 615) used with the audio driver 629 and other audio processing devices to create audio used to accompany the video output by the MMCA 640-1, 640-2. The source information handling system 601-1, as well as the sink information handling system 601-2, may include a camera (e.g., 622) used to capture images of the users while engaged with the video conference session executed by the MMCA 640-1, 640-2.

Similar to FIG. 5 above, FIG. 6 shows the interactions between the different hardware, software, and firmware components of the source information handling system 601-1 and sink information handling system 601-2 relative to an information handling system performance optimizer application 675. In an embodiment, the information handling system performance optimizer application 675 may be an application executed remotely from the source information handling system 601-1 and sink information handling system 601-2 such that, in some embodiments, the data associated with the HOP heat map and its HOP video frame slice group or optionally the delta HOP heat map may be transmitted over, for example, a network and facilitated by the information handling system performance optimizer application 675. In an embodiment, the OOB communications between the source information handling system 601-1 and the sink information handling system 601-2 may be facilitated by the information handling system performance optimizer application 675 that may also participate in the video conference session via the MMCA host server 653. In an embodiment, the information handling system performance optimizer application 675 may form part of a MMCA not native to the information handling system (e.g., 601-1, or 601-2). In this embodiment, the MMCA may be a web-based application that provides or helps to facilitate the services described herein to multiple users over a network.

In an alternative embodiment, an agent local to the source information handling system 601-1 or sink information handling system 601-2 can receive the data associated with the HOP heat map and its HOP video frame slice group as well as the delta HOP heat map. In this embodiment, the agent may be executed the locally in either or both of the source information handling system 601-1 or sink information handling system 601-2 in order to provide the data as described herein between the information handling systems.

During operation, the information handling system performance optimizer application 675 may be executed on the source information handling system 601-1 and sink information handling system 601-2 prior to or during the video conference session the users are engaged in. The information handling system performance optimizer application 675 may be executed locally on the source information handling system 601-1 or sink information handling system 601-2 or may be executed remotely as described herein.

The source information handling system 601-1 and sink information handling system 601-2 may include a video/graphic display device (e.g., 610). The video/graphic display device (e.g., 610) in an embodiment may function as a liquid crystal display (LCD), an organic light emitting diode (OLED), a flat panel display, or a solid-state display. Other input/output devices include a speaker 615 and a microphone 624 that outputs audio to a user and captures audio samples from a user, respectively as described herein. Although FIG. 6 shows that the source information handling system 601-1 only includes a microphone 624 and camera 622 to capture audio input and images of the remote participant user, respectively, the present specification contemplates that the sink information handling system 601-2 also includes these input devices for capturing audio input and images of the user of the sink information handling system 601-2. Similarly, although FIG. 6 shows only the sink information handling system 601-2 including a speaker 615 and a video/graphic display device 610 for audio playback and display of video to the user of the sink information handling system 601-2, the present specification contemplates that the source information handling system 601-1 also includes these input devices for audio playback and display of video to the remote participant user of the information handling system 601-1.

Figure 7:
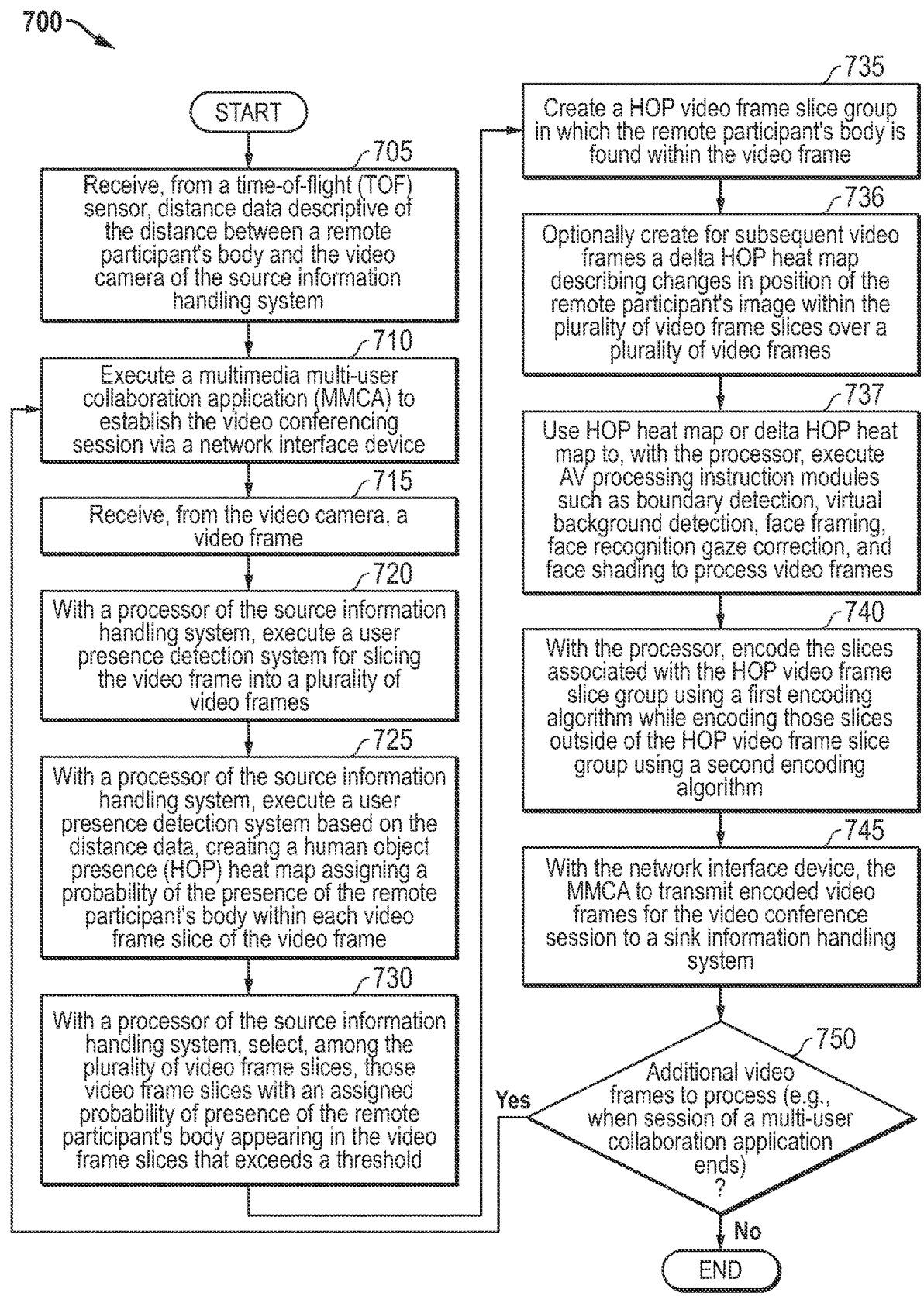
FIG. 7 is a flow diagram illustrating a method of reducing resource consumption at a source information handling system during a video conferencing session according to an embodiment of the present disclosure.

FIG. 7 is a flow diagram illustrating a method 700 of reducing resource consumption at an information handling system during a video conferencing session according to an embodiment of the present disclosure. In particular, the method utilizes a proximity sensor to assist in generating a probability-based human object presence (HOP) heat map within slices of a video frame. The HOP heat map is used to assist in computational determinization of a remote participant image location and background in the video frame in an example embodiment during image processing of video frames to be transmitted via an MMCA. The method 700 may include, at block 705, receiving, from a time-of-flight (TOF) sensor, distance data descriptive of the distance between a user's body and the video camera of a source information handling system. Although the present specification describes the distance data as being provided by a TOF sensor, the present specification contemplates that other types of sensors such as IR sensors and the like may be used to determine distance data of a user's body.

The method 700 may further include, at block 710, executing an MMCA to establish the video conferencing session via a network interface device. The MMCA may be any application that, when executed by the processor, initiates a video conference session between a plurality of users such as between the user of a sink information handling system and another remote participant user of a source information handling system. MMCA may utilize an MMCA central facility server to engage in the video conference in an embodiment. With the MFPIP and MPCAPI, the MMCA may apply the MFPIP default settings for such processing, reprocessing, encoding, decoding, capture, and display of the video frames used to transmit outbound video frames or display inbound video frames to the user at the video/graphic display device during a video conference session. Examples of a MMCA may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The method 700 may further include receiving, from the video camera, one or more video frames at block 715. The streaming media driver, in an embodiment for example, may receive video or audio samples captured by peripheral video cameras (or microphones) in communication therewith, according to default or optimized media capture instructions. In an embodiment, an audio driver may also receive audio samples captured by the microphone in communication therewith, according to such received media capture instructions. In these embodiments, audio driver may operate as mini-driver or child device to the streaming media device driver. The streaming media device driver may be in communication with an AV processing instruction manager via one or more ports (e.g., as described in greater detail with respect to the device proxy 445 of FIG. 4) such that video or audio samples received by the streaming media device driver may be transmitted to an AV processing instruction manager, in an embodiment. In such a way, the AV processing instruction manager may direct retrieval of a video sample captured at a video camera operably connected to a source information handling system and retrieval of an audio sample captured at a microphone operably connected to the source information handling system.

At block 720, the method 700 may further include, with a processor of the source information handling system, executing a user presence detection system for slicing the video frame into a plurality of video frame slices. The user presence detection system described herein may be executed by, for example, an AV processing instruction manager directing the execution of a video frame user presence detection module associated with the user presence detection system as described herein. Upon execution of the video frame user presence detection module, the method 700 may continue at block 725 with creating a human object presence (HOP) heat map assigning a probability of the presence of the user's body within each video frame slice of the video frame. In an embodiment, the execution of the video frame user presence detection module or any other user presence detection system described herein, causes the processor (or a processor) of the source information handling system to slice each video frame into a plurality of video frame slices. The number and position of the video frame slices created may be selected to most efficiently detect the presence and non-presence of a remote participant user of the source information handling system within the video frame slice. The AV processing instruction manager may receive the distance data from the TOF sensor associated with or included with the video camera and, based on that distance data, create a HOP heat map. This HOP heat map may be used to determine which of the video frame slices the user's body or any portion of the user's body is present.

In an embodiment, to create the HOP heat map, the video frame UPD AV processing instruction module of the source information handling system may be configured to assign a probability of the presence of the user's body within each video frame slice of the video frame. The video frame UPD AV processing instruction module of the source information handling system may do this by executing a HOD algorithm that analyzes the distance data associated with each slice of the video frame and assigns an integer value of between 0 and 100, for example, and where a threshold integer value is met, a probability value is assigned to each slice of the video frame. For example, the distance data acquired within a first slice of a video frame may indicate that an object is about 610 mm (about 2 feet) from the video camera of the source information handling system. Similarly, the distance data acquired within a second slice of a video frame may indicate that an object is about 1830 mm (about 6 feet) from the video camera of the source information handling system. The execution of the HOD algorithm by the video frame UPD AV processing instruction module of the source information handling system may determine that, in the context of the execution of the MMCA, the object that is about 610 mm from the video camera indicates a human is present and detected, at least, within the first slice of the video frame. The execution of the HOD algorithm at the source information handling system may allow video frame UPD AV processing instruction module to make similar determinations with regard to the second slice of the video frame and, due to the significantly longer distances detected, the 1830 mm distances indicate a wall is present behind the user. In an embodiment, where no distance data is found for the second slice, this may indicate that the distance sensor cannot detect an object behind the remote participant user of the source information handling system (e.g., any wall, if present, is too far behind the remote participant to be detected) and video frame UPD AV processing instruction module executing the HOD algorithm may determine that the other slices (e.g., the first slice) includes a human image.

During execution of the HOD algorithm by the processor, in an embodiment, the distance data associated with each slice of the video frame may be compared to each other and the threshold distance may be calculated based on distance data among all of the slices of the video frames. In this embodiment, a scale may be created where the shortest distance data detected among all distance data in each slice of the video frame is assigned a highest value (e.g., 100) while the longest distance data detected among all distance data in each slice is assigned a lowest value (e.g., 0). In this embodiment, a distance value of, for example 51, assigned to the first slice of the video frame may indicate the presence of a human object within that first video frame when the threshold value is assigned to be 50. Thus, in this example embodiment, because the threshold value is set to 50, any object within any given slice falling in the range of 51-100 may be indicated by video frame UPD AV processing instruction module executing the HOD algorithm as being a human object, while any object within any given slice falling in the range of 0-50 may not be indicated as being a human object.

In an alternative embodiment, the distance data associated with each slice of the video frame may be compared to each other and the threshold distance may be calculated based on distance data among all of the slices of the video frames using a different scale where the highest value is set to be the location of the video camera. In this embodiment, a scale may be created where the shortest distance data is not detected and instead the location of the video camera is assigned the highest value (e.g., 100). The video frame UPD AV processing instruction module executing the HOD algorithm at the source information handling system may then assign the longest distance data detected among all distance data in each slice as the lowest value (e.g., 0). In this embodiment, a distance value of, for example 51, assigned to the first slice of the video frame may indicate the presence of a human object within that first video frame when the threshold value is assigned to be 50. Thus, in this example embodiment, because the threshold value is set to 50, any object within any given slice falling in the range of 51-100 may be indicated by the videoframe UPD AV processing instruction module of the source information handling system executing the HOD algorithm as being a human object, while any object within any given slice falling in the range of 0-50 may not be indicated as being a human object. In this embodiment, therefore, the distance between the video camera and a background of the remote participant user of the source information handling system may be the initial scaling distance used to determine whether any intermediate objects such as parts of the user's body are detected.

In any scaling example described herein, the execution of the HOD algorithm by the video frame UPD AV processing instruction module of the source information handling system allows the video frame UPD AV processing instruction module to assign a value or probability value to each slice of the video frame. Again, a probability threshold value may be assigned to each slice of the video frame indicating a probability of presence of the body of the remote participant user of the source information handling system within each respective slice. From this data, the HOP heat map is generated.

The method 700, at block 730, may continue with selecting, among the plurality of video frame slices, those video frame slices with an assigned probability of presence of the user's body appearing in the video frame slices that exceeds a threshold using the processor. In this embodiment, this selection of slices that include the user's body allows the method, at block 735 to designate a HOP video frame slice group that groups together each of those slices of the video frame where the presence of the user's body has been detected (e.g., distance data exceeds a threshold value). By grouping a number of slices together to create the HOP video frame slice group, the video frame UPD AV processing instruction module of the source information handling system may determine where, within the video frame, the user's image resides. During video conferencing sessions, the remote participant user of the source information handling system usually sits in front of the video camera anywhere from 2 to 3 feet from the video camera. As such, the video frame includes an image of the remote participant's body (usually from the chest up) with a background behind the remote participant. The image of the remote participant may be considered the most important part of the video frame and, according to the embodiments described herein, may be encoded differently than those slices of the video frame that are not included as being part of the HOP video frame slice group. In one embodiment, the present specification contemplates an embodiment where a new HOP heat map and HOP video frame slice group is sent for every video frame sent by the source information handling system to the sink information handling system.

In an alternative embodiment at block 736, may continue with optionally creating, for subsequent video frames, a delta HOP heat map describing changes in position of the remote participant's image within the plurality of video frame slices over a plurality of video frames. As described herein, the creation of the delta HOP heat map may be done with a UMD AV instruction processing module of the source information handling system so that a new HOP heat map is not sent with every video frame sent to the sink information handling system. Instead, the delta HOP heat map may be sent for any subsequent video frame so that the processing resources used to encode and decode the video frame may be further reduced and the data transmitted to describe the HOP heat map is also reduced. The delta HOP heat map may describe changes in position of the human image within the plurality of video frame slices over a plurality of video frames captured by the video camera of the source information handling system. In a specific embodiment, the delta HOP heat map may include data descriptive of only those changes in the subsequent video frame as compared to the originally sent HOP heat map. The UMD AV instruction processing module of the source information handling system may determine from a plurality of sequential frames that movement is occurring and direction of movement within the video frames and among the determined video frame slices. In this embodiment, the HOP video frame slice group may change location and size within any given video frame presented at the MFPIP. This delta HOP heat map may describe these changes as the remote participant user of the source information handling system, for example, moves left, right, forward, or backwards during the video conferencing session. The delta HOP heat map and changes to the HOP video frame slice group will be generated in this embodiment for videoframes subsequent to a first video frame. The first video frame will be transmitted by a sink information handling system with a first videoframe HOP heat map and HOP video frame slice group that serves as reference relative to later delta HOP heat map data generated and transmitted. Similar to the data associated with the HOP heat map and its HOP video frame slice group, the data associated with the delta HOP heat map may be sent to the sink information handling systems before or concurrently with the video frames being sent.

At block 740, the HOP heat map may also be used to facilitate operation of one or more post processing tasks that the video engine may perform on the captured video frames. The HOP heat map and HOP video frame slice group designation provides a fairly good indication of which slices of the video frame contain an image of the body of the remote participant user of the source information handling system and which slices do not, and may comprise a background portion of the video frame. This information of the HOP heat map and HOP video frame slice group may be provided to one or more AV processing instruction modules of the source information handling system or the sink information handling system to process the video frames. For example, the HOP heat map and HOP video frame slice group may be provided to a boundary detection AV processing instruction module of the source information handling system to identify slices of the video frame where focus of boundary detection algorithms, such as matting or segmentation, may be concentrated. This may reduce the computation burden of the boundary detection algorithm at the source information handling system and reduce the area of the video frame that need to be processed. Other AV processing instruction modules of the source information handling system also rely on identification of locations of the head, face, eyes, or body of the remote participant in the videoframe images. For such AV processing instruction modules at the source information handling system, the HOP heat map and HOP video frame slice group may assist in narrowing the slices of the videoframe that must be processed. Several such AV processing instruction modules are described in embodiments of the present disclosure.

The method 700 may include, with the processor, encoding the slices associated with the HOP video frame slice group using a first encoding algorithm at the source information handling system while encoding those slices outside of the HOP video frame slice group using a second encoding algorithm at block 742. In an embodiment and prior to sending the HOP video frame slice group, the HOP video frame slice group may be encoded at the source information handling system using a first encoding algorithm and upon execution of the encoding processing instruction module by the AV processing instruction manager of the source information handling system. Additionally, those slices falling outside of the HOP video frame slice group may be encoded using a second encoding algorithm having a lower computational burden than the first encoding algorithm upon execution of the encoding processing instruction module by the AV processing instruction manager of the source information handling system according to various embodiments described in the present disclosure. This allows the AV processing instruction manager to encode slices of the video frame differently such that processing resources are reserved while the visual composition of the user's image is not compromised. The first and second types of encoding used may be sent to the MMCA host server system or to the sink information handling system.

The method may include, at block 745, with the MMCA transmitting the encoded video frames for the video conference session to, for example, one or more sink information handling systems. This transmission may be facilitated through the operations of a network interface device and an MMCA host server system or systems. In an embodiment, in order to properly decode the encoded video frames, the sink information handling system may be provided with data associated with the HOP heat map and its HOP video frame slice group created by the videoframe UPD AV processing instruction module of the source information handling system. This data may include, among others, data describing the number of slices of the video frame, those slices that fall within the HOP video frame slice group, those slices the fell outside of the HOP video frame slice group (may be determined by default), the encoding algorithm used by the source information handling system to encode the HOP video frame slice group, and the encoding algorithm used by the source information handling system to encode the slices not present within the HOP video frame slice group. This process may be repeated for the series of video frames of a videoconferencing session. In another embodiment, the sink information handling system may be provided with data associated with the delta HOP heat map indicating changes to HOP video frame slice groups for subsequent video frames after a first video frame. The sink information handling system will then receive the updated information of the HOP video frame slice group slices for application of the second decoding algorithm in this embodiment. This data allows the sink information handling system to properly decode the video frame as the stream of video frames is sent to the sink information handling systems from the information handling system in either embodiment, as described in greater detail with respect to FIG. 8, below.

The data associated with the HOP heat map and its HOP video frame slice group may, in an embodiment, be sent to the sink information handling systems prior to or concurrently with the video frames associated with the HOP heat map and its HOP video frame slice group. In an embodiment, the number of HOP heat maps sent to the sink information handling system may be less than the number of video frames. In an embodiment, the source information handling system may also send to a sink information handling system data descriptive of a delta HOP heat map. The delta HOP heat map may describe changes in position of the human image within the plurality of video frame slices over a plurality of video frames captured by the video camera.

In an embodiment, the data associated with the HOP heat map and its HOP video frame slice group, or data associated with the delta HOP heat map may be sent to these sink information handling systems using an OOB communication method over an OOB communication link. The OOB communication link in an embodiment may be different from the communication link used by the source information handling system to send the video frames to the sink information handling systems engaged in the video conferencing session. In other embodiments, the data associated with the HOP heat map and its HOP video frame slice group, or data associated with the delta HOP heat map may be sent to these sink information handling systems using the same wireless links over which the video frames are also transmitted.

The method 700 may continue with determining whether any additional video frames are to be processed at block 750. Where no other video frames are to be processed per the method 700 described herein, the process may end. In an embodiment, where no more video frames are to be processed, this may be a result of a termination of the MMCA by the remote participant thereby ending the video conference session. Where further video frames are to be processed, the method may continue at block 710 and the process may continue according to the method of FIG. 7 for additional video frame created for a videoconferencing session.

Figure 8:
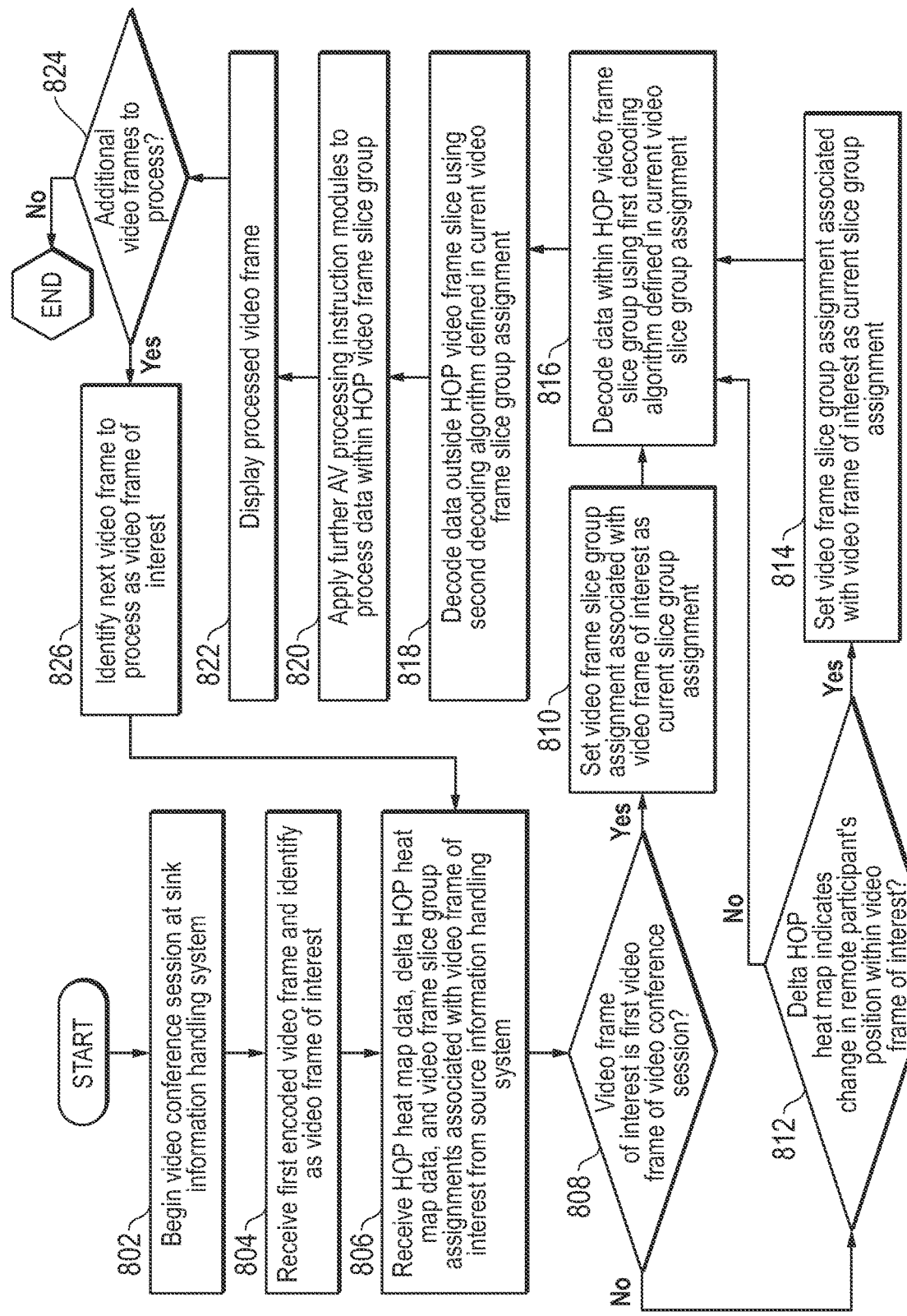
FIG. 8 is a flow diagram illustrating a method of reducing resource consumption at a sink information handling system during a video conferencing session according to another embodiment of the present disclosure.

FIG. 8 is a flow diagram illustrating a method 800 of reducing resource consumption at a sink information handling system during a video conferencing session according to an embodiment of the present disclosure. As described herein, the sink information handling system may decrease processing resources consumed during decoding of video frames received from a source information handling system pursuant to execution of a videoconference session between the two information handling systems. As also described herein, the sink information handling system may further decrease processing resources consumed during further processing of the video frames thus decoded by limiting applications of certain algorithms to a portion of the video frames in which the remote participant user of the source information handling system appears.

At block 802, the sink information handling system in an embodiment and the source information handling system may join a videoconference session with one another.

The sink information handling system in an embodiment may receive a first encoded video frame and identify that video frame as the video frame of interest at block 804. The sink information handling system may receive a video frame from the source information handling system associated with a HOP heat map, such as during a videoconference session. Additionally, audio data may be received. In this embodiment, when the video frame is received, the encoding data associated with the indication of the HOP video frame slice group of designated slices via the HOP heat map data or delta HOP heat map data may be applied as described herein. In an embodiment, the HOP heat map or delta HOP heat map data may be received prior to the sink information handling system receiving the video frame so that the information and algorithms used to decode the encoded video frame may be acquired and prepared for use. In other embodiments, the HOP heat map or delta HOP heat map data may be received concurrently with the video frames during a video conference. Additionally, indication of types of encoding algorithms to be applied may be received by the sink information handling system.

At block 806, the sink information handling system may receive HOP heat map data, delta HOP heat map data, and video frame slice group assignments associated with the video frame of interest from the source information handling system. As described herein, in order to properly decode the encoded video frame, the sink information handling system may be provided with data describing the number of slices of the video frame, those slices that fall within the HOP video frame slice group, those slices the fell outside of the HOP video frame slice group (may be determined by default), the first encoding algorithm used by the source information handling system to encode the HOP video frame slice group, and the second encoding algorithm used by the source information handling system to encode the slices not present within the HOP video frame slice group. This allows the sink information handling system to properly decode the video frame as the stream of video frames is received at the sink information handling systems from the source information handling system. In an embodiment, the data associated with the HOP heat map and the HOP video frame slice group may be received using an OOB communication method over an OOB communication link, such as via an information handling system optimizer system, or in-band, using the same wireless link upon which the video frames are received. In another embodiment, the OOB communication link may be different from the communication link used by the sink information handling system to receive the video frames from the source information handling systems engaged in the video conferencing session. In some embodiments, the HOP heat map and HOP video frame slice group may be repeatedly generated at the source information handling system and transmitted to the sink information handling system.

The sink information handling system in an embodiment may also receive a HOP heat map and a delta HOP heat map describing changes in position of the remote user image within the plurality of video frame slices over a plurality of video frames. As described herein, the HOP heat map may indicate the portions of the video frame of interest in which the remote participant's body appears. As also described herein, the delta HOP heat map may describe changes in position of the human image within the plurality of video frame slices over a plurality of video frames captured by the video camera. The HOP video frame slice group may change location and size within any given video frame presented at the MFPIP via the multimedia processing controller API and streaming media device driver. This delta HOP heat map may describe these changes as the remote participant, for example, moves left, right, forward, or backwards during the video conferencing session. The delta HOP heat map and changes to the HOP video frame slice group will be provided in this embodiment for videoframes subsequent to a first video frame. The first video frame will be received from a source information handling system with a first videoframe HOP heat map and HOP video frame slice group for reference relative to later delta HOP heat map data. Similar to the data associated with the HOP heat map and its HOP video frame slice group, the data associated with the delta HOP heat map may be received at the sink information handling systems before or concurrently with the video frames being received. In an embodiment, the data associated with the delta HOP heat map may be received using an OOB communication method over an OOB communication link, such as via an information handling system optimizer system. In an embodiment, the OOB communication link may be different from the communication link used by the sink information handling system to receive the video frames from the source information handling systems engaged in the video conferencing session.

The sink information handling system in an embodiment may determine at block 808 whether the video frame of interest is the first video frame received since the sink information handling system has joined the current videoconference. If the video frame of interest is the first video frame received during the current videoconference, the method may proceed to block 810 to designate the HOP video frame slice group assignment received at block 806 as the current video frame slice group assignment. If the video frame of interest is not the first video frame received during the current videoconference, an assignment of video frame slice group may have been made with respect to previously received video frames, and the method may proceed to block 812 to determine whether a new assignment of video frame slice group is necessary based on the delta HOP heat map received at block 806.

At block 810, in an embodiment in which the video frame of interest is the first video frame of the current videoconference session, the sink information handling system may set the HOP video frame slice group assignment associated with the video frame of interest as the current slice group assignment. This video frame slice group assignment may later define or limit execution of a decoding module and further AV processing instruction modules at the sink information handling system. The method may then proceed to block 816 for decoding of the video frame slices.

Returning to block 812, in an embodiment in which the video frame of interest is not the first video frame of the current videoconference session, as determined at block 808, the sink information handling system may determine whether the delta HOP heat map indicates a change in the remote participant's position within the video frame of interest. For example, in an embodiment described with reference to FIG. 5, unusual motion detection processing instruction module 582 of the sink information handling system (e.g., 500) in such an embodiment may use the delta HOP heat map to determine when change to assignment of various video frame slices has occurred, rather than processing each HOP heat map to determine which video slices of each video frame fall within the HOP video frame slice group and which video frame slices fall outside the HOP video frame slice group using the HOP heat map. Thus, in an embodiment, the sink information handling system (e.g., 500) may set the assignments of the HOP video frame slice group for the newly received video frame as the current or default HOP video frame slice group assignment.

By only updating these assignments of certain video frame slice groups as falling within or outside the HOP video frame slice group when a change in the user's position has been detected, the sink information handling system (e.g., 500) may further decrease processing power associated with repeatedly determining which video frame slices fall within or outside the HOP video frame slice group for each received video frame. If the delta HOP heat map associated with the video frame of interest, as received at block 806, indicates no movement of the remote participant between previous received video frames and the video frame of interest, the HOP video frame slice group assignment from previously received video frames may be sufficient for the processing of the video frame of interest, and the method may proceed to block 816 for decoding of the video frame of interest. If the delta HOP heat map associated with the video frame of interest indicates movement of the remote participant has occurred between previously received video frames and the video frame of interest, the method may proceed to block 814 for reassignment of the HOP video frame slice group based on the HOP heat map associated with the video frame of interest.

At block 814, in an embodiment in which the delta HOP heat map associated with the video frame of interest indicates movement of the remote participant has occurred between previously received video frames and the video frame of interest, the sink information handling system may set the HOP video frame slice group assignment associated with the video frame of interest, as received at block 806, as the current slice group assignment. The method may then proceed to block 816 for decoding of the video frame.

Upon determination of the HOP video frame slice group assignment (e.g., at block 810 or block 814), the sink information handling system in an embodiment may decode data within the HOP video frame slice group using a first decoding algorithm defined in the current video frame slice group assignment. As described herein, the HOP video frame slice group may be encoded using a first encoding algorithm and upon execution of the encoding processing instruction module by the AV processing instruction manager at the source information handling system. In this embodiment, the information handling system may be made aware of the first encoding algorithm used to encode the data associated within the HOP video frame slice group from communication from the source information handling system or MICA host server. With this, the sink information handling system may execute an appropriate first decoding algorithm to decode and decompress the video frame data within the HOP video frame slice group.

At block 818, the sink information handling system in an embodiment may decode data outside the HOP video frame slice group using a second decoding algorithm defined in the current video frame slice group assignment. Again, as described herein, the slices outside of the HOP video frame slice group may be encoded using a second encoding algorithm having a lower computational burden than the first encoding algorithm at the source information handling system. In this embodiment, the sink information handling system may be made aware of the second encoding algorithm used to encode the data associated with the slices outside of the HOP video frame slice group from communication from the source information handling system or MICA host server. With this, the sink information handling system video processing engine may execute an appropriate second decoding algorithm to decode and decompress the video frame data from slices outside the HOP video frame slice group.

The sink information handling system in an embodiment may apply further AV processing instruction modules to process data within the HOP video frame slice group at block 820. For example, in an embodiment described with reference to FIG. 5, for each decoded video frame, the video frame user presence detection processing instruction module 581 of the sink information handling system (e.g., 500) in an embodiment may use the HOP heat map to determine which of the video frame slices fall within the HOP video frame slice group, and which video frame slices fall outside the HOP video frame slice group. In some embodiments, the sink information handling system (e.g., 500) may also receive a delta HOP heat map generated at the source information handling system indicating when the remote participant has shifted positions within the encoded video frames. The unusual motion detection processing instruction module 582 of the sink information handling system (e.g., 500) in such an embodiment may use the delta HOP heat map to determine when assignment of various video frame slices has occurred, rather than processing each HOP heat map to determine which video slices of each video frame fall within the HOP video frame slice group and which video frame slices fall outside the HOP video frame slice group using the HOP heat map. Thus, in an embodiment, the sink information handling system (e.g., 500) may set the assignments of the HOP video frame slice group for the newly received video frame as the current or default HOP video frame slice group assignment. By only updating these assignments of certain video frame slice groups as falling within or outside the HOP video frame slice group when a change in the user's position has been detected, the sink information handling system (e.g., 500) may further decrease processing power associated with repeatedly determining which video frame slices fall within or outside the HOP video frame slice group for each received video frame.

The AV processing instruction manager 541 in an embodiment in which the information handling system 500 is a sink information handling system may further direct the video processing engine 580 to execute a user framing module 585, a super resolution module 586, or a zoom and face normalizer module 587. The user framing module 585 in an embodiment may operate to identify a user's face and center the user's face within each captured image making up the video sample. In an embodiment, the super resolution module 586 may recover a high-resolution image from a low-resolution image, using a known degradation function. The zoom and face normalizer module 587 of the sink information handling system (e.g., 500) in an embodiment may operate to crop, enlarge, or scale down various video frames of the remote participant user of the source information handling system to normalize the size of the remote participant's face across each of the video frames received from the source information handling system.

The AV processing instruction manager 541 in various embodiments may decrease the processing resources consumed during execution of one or more of these AV processing instruction modules described directly above based on identification of the HOP video frame slice group in which a remote participant appears, as determined by the UMD processing instruction module 582, the video frame UPD processing instruction module 581, or both, or through receipt of such an identification directly from the source information handling system via the IHSPO 575. For example, the AV processing instruction manager 541 executing the user framing module 585 in an embodiment may limit processing resources consumed during execution of the algorithm for framing the user's face within each video frame by placing the HOP video frame slice group in which user presence has been detected within the center of the video frame, negating the need to identify the user's face through face recognition algorithms. As another example, the AV processing instruction manager 541 executing the super resolution module 586 in an embodiment may limit execution of the super resolution module algorithm to the portion of each video frame in which the remote participant appears, as these portions may be considered to be the most important. In still another example, the AV processing instruction manager 541 executing the zoom and face normalizer module 587 in an embodiment may use the HOP heat map data, delta HOP heat map data, or HOP video frame slice group identifications to identify the HOP video frame slice group in which the remote participant is present, and to crop, enlarge, or scale down various video frames such that the portion of each of these video frames in which the remote participant appears (as determined based on the HOP heat map or delta HOP heat map) remains consistent across all video frames.

At block 822, the sink information handling system may display the processed video frame in an embodiment. Because the video frames are streaming, the decoding of any subsequent video frames per the method 800 described herein may be done repeatedly to present real-time video at the video/graphic display device to conduct the inbound AV data from one or more source information handling systems during a videoconference session. Additionally, an audio driver may receive inbound audio data for playback at a speaker at the sink information handling system.

The sink information handling system may determine at block 824 whether additional video frames need to be processed in an embodiment. Where no other video frames are to be processed per the method 800 described herein, the process may end here. In an embodiment, where no more video frames are to be processed, this may be a result of a termination of the MMCA by the user thereby ending the video conference session. Where further video frames are to be processed, the method may continue at block 805 and the process may continue in this manner for plural video frames created during the videoconference session.

At block 826, in an embodiment in which additional video frames need to be processed, the sink information handling system may identify the next video frame to process as the video frame of interest. The method may then proceed back to block 806 for receipt of HOP heat map data, delta HOP heat map data, and video frame slice group assignment associated with the newly identified video frame of interest. By repeating the loop between block 806 and 826, the sink information handling system in an embodiment may limit processing resources consumed during decoding of video frames received at the sink information handling system and processing resources consumed during further processing of such decoded video frames, based on presence of the remote participant's image within only portions of those received video frames.

The blocks of the flow diagrams of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A sink information handling system executing a multimedia multi-user collaboration application (MMCA), comprising:
a network interface device to receive, via a first network link, a plurality of video frame slices of a video frame of a remote participant user of a source information handling system participating in a video conference session conducted by a processor executing code instructions of the MMCA;
the network interface device to receive a human object presence (HOP) heat map assigning a probability of presence of the remote participant's body within each video frame slice of the video frame, and an identification of a subset of the plurality of video frame slices having an assigned probability of presence of the remote participant's body that exceeds a threshold probability as a human object presence (HOP) video frame slice group where the remote participant's body appears within the video frame;
the processor to execute a first decoding algorithm to decode data within the HOP video frame slice group to generate decoded HOP video frame slice data; and
a digital display device to display the video frame, as transformed by the audio/visual processing instruction algorithm.

2. The sink information handling system of claim 1 further comprising:
the processor to execute a second decoding algorithm having a lower computational burden than the first decoding algorithm to decode data outside of the HOP video frame slice group.

3. The sink information handling system of claim 1, wherein the audio/visual processing instruction algorithm is executed by a super resolution module.

4. The sink information handling system of claim 1, wherein the audio/visual processing instruction algorithm is executed by a zoom and face normalizer module.

5. The sink information handling system of claim 1, wherein the audio/visual processing instruction algorithm is executed by a user framing module.

6. The sink information handling system of claim 1, wherein the network interface device receives data defining the HOP video frame slice group from a source information handling system for decoding of the video frame using an out-of-band (OOB) communication network link, separate from the first network link.

7. The sink information handling system of claim 1 further comprising:
the processor limiting execution of an audio/visual processing instruction algorithm for transforming the video frame to the decoded HOP video frame slice data.

8. A method of reducing resource consumption at a sink information handling system during a video conferencing session, comprising:
executing a multimedia multi-user collaboration application (MMCA) to establish a video conferencing session via a network interface device;
receiving at the network interface device, via a first network link, a plurality of video frame slices of a video frame of a remote participant user of a source information handling system participating in a video conference session conducted by a processor executing code instructions of the MMCA;
receiving at the network interface device, via a second network link, a human object presence (HOP) heat map assigning a probability of presence of the remote participant's body within each video frame slice of the video frame, and an identification of a subset of the plurality of video frame slices having an assigned probability of presence of the remote participant's body that exceeds a threshold probability as a human object presence (HOP) video frame slice group where the remote participant's body appears within the video frame;
executing a first decoding algorithm, via a processor, to decode data within the HOP video frame slice group to generate decoded HOP video frame slice data;
executing a second decoding algorithm having a lower computational burden than the first decoding algorithm to decode data outside of the HOP video frame slice group;
limiting execution by the processor of an audio/visual processing instruction algorithm for transforming the video frame to the decoded HOP video frame slice data; and
displaying the video frame via a display device, as transformed by the audio/visual processing instruction algorithm.

9. The method of claim 8 further comprising:
executing, via the processor, a second decoding algorithm having a lower computational burden than the first decoding algorithm to decode data outside of the HOP video frame slice group.

10. The method of claim 8, wherein the audio/visual processing instruction algorithm is executed by a super resolution module.

11. The method of claim 8, wherein the audio/visual processing instruction algorithm is executed by a zoom and face normalizer module.

12. The method of claim 8, wherein the audio/visual processing instruction algorithm is executed by a user framing module.

13. The method of claim 8, wherein the second network link is an out-of-band (OOB) communication network link.

14. The method of claim 8 further comprising:
executing, via a processor, code instructions of an AV processing instruction manager to offload execution of the audio/visual processing instruction algorithm to an alternative processor in the information handling system.

15. A sink information handling system executing a multimedia multi-user collaboration application (MMCA), comprising:
a network interface device to receive, via a first network link, a plurality of video frame slices of a video frame of a remote participant user of a source information handling system participating in a video conference session conducted by a processor executing code instructions of the MMCA;
the network interface device to receive a human object presence (HOP) heat map assigning a probability of presence of the remote participant's body within each video frame slice of the video frame, and an identification of a subset of the plurality of video frame slices having an assigned probability of presence of the remote participant's body that exceeds a threshold probability as a human object presence (HOP) video frame slice group where the remote participant's body appears within the video frame;

the processor to execute a first decoding algorithm to decode data within the HOP video frame slice group to generate decoded HOP video frame slice data and to execute a second decoding algorithm having a lower computational burden than the first decoding algorithm to decode data outside of the HOP video frame slice group;

the processor limiting execution of an audio/visual processing instruction algorithm for transforming the video frame to the decoded HOP video frame slice data; and a digital display device to display the video frame, as transformed by the audio/visual processing instruction algorithm.

16. The sink information handling system of claim 15 further comprising:

a user presence detection system providing data descriptive of a delta HOP heat map descriptive of changes in position of the human image within the plurality of video frame slices over a plurality of subsequent video frames received from the source information handling system; and the MMCA to send the data of the delta HOP heat map to the sink information handling system for limiting execution of the audio/visual processing instruction algorithm for transforming the plurality of subsequent video frames to subsequent decoded HOP video frame slice data.

17. The sink information handling system of claim 15 further comprising:

the processor configured to execute an unusual motion detection processing instruction module to calculate a delta HOP heat map descriptive of changes in position of the human image within the plurality of subsequent video frame slices over a plurality of video frames received from the source information handling system after a first received video frame by comparing historic HOP heat maps with a currently created HOP heat map.

18. The information handling system of claim 15 further comprising:

the processor executing the audio/visual processing instruction algorithm to center a face of the remote participant within the video frame.

19. The information handling system of claim 15 further comprising:

the processor executing the audio/visual processing instruction algorithm to perform a degradation function to the decoded HOP video frame slice data.

20. The information handling system of claim 15 further comprising:

the processor executing the audio/visual processing instruction algorithm to crop the video frame to exclude a portion of the data outside the HOP video frame slice group.

* * * * *